(12) United States Patent
Ito et al.

(10) Patent No.: US 7,657,727 B2
(45) Date of Patent: Feb. 2, 2010

(54) SECURITY FOR LOGICAL UNIT IN STORAGE SUBSYSTEM

(75) Inventors: Ryusuke Ito, Odawara (JP); Yoshinori Okami, Odawara (JP); Katsuhiro Uchiumi, Odawara (JP); Yoshinori Igarashi, Odawara (JP); Koichi Hori, Odawara (JP)

(73) Assignee: Hitachi, Ltd., Tokyo (JP)

( * ) Notice: Subject to any disclaimer, the term of this patent is extended or adjusted under 35 U.S.C. 154(b) by 132 days.

(21) Appl. No.: 11/407,978

(22) Filed: Apr. 21, 2006

(65) Prior Publication Data

US 2006/0190696 A1 Aug. 24, 2006

Related U.S. Application Data

(63) Continuation-in-part of application No. 10/902,795, filed on Aug. 2, 2004, now Pat. No. 7,082,503, which is a continuation of application No. 10/076,553, filed on Feb. 19, 2002, now Pat. No. 6,779,083, said application No. 11/407,978 is a continuation-in-part of application No. 11/330,261, filed on Jan. 12, 2006, which is a continuation of application No. 10/737,477, filed on Dec. 15, 2003, now Pat. No. 7,024,410, which is a continuation of application No. 09/561,404, filed on Apr. 27, 2000, now Pat. No. 6,684,209.

(30) Foreign Application Priority Data

Jan. 14, 2000 (JP) ............................. 2000-010115
Jul. 13, 2001 (JP) ............................. 2001-213642

(51) Int. Cl.
G06F 9/26 (2006.01)
G06F 9/34 (2006.01)

(52) U.S. Cl. .................................................... 711/221
(58) Field of Classification Search .................. 711/221
See application file for complete search history.

(56) References Cited

U.S. PATENT DOCUMENTS 4,144,583 A 3/1979 Lawson
4,914,656 A 4/1990 Dunphy, Jr. et al.
(Continued)

FOREIGN PATENT DOCUMENTS

EP 0709988 5/1996
EP 0881560 12/1998
(Continued)

OTHER PUBLICATIONS

H. Yoshida, "LUN Security Considerations for Storage Area Networks", Hitachi Data Systems, 1999, pp. 1-7.
Smith et al "Tachyon: a gigabit Fibre Channel Protocol Chip", Hewlett-Packard Journal, vol. 47, No. 5, Oct. 1996, pp. 94-98, internet copy.

(Continued)

Primary Examiner—Matt Kim
Assistant Examiner—Edward J Dudek
(74) Attorney, Agent, or Firm—Mattingly & Malur, P.C.

(57) ABSTRACT

Mapping tables are for stipulating information for primarily identifying computers, information for identifying a group of the computers and a logical unit number permitting access from the host computer inside storage subsystem, in accordance with arbitrary operation method by a user, and for giving them to host computer. The invention uses management table inside the storage subsystem and allocates logical units inside the storage subsystem to a host computer group arbitrarily grouped by a user in accordance with the desired form of operation of the user, can decide access approval/rejection to the logical unit inside the storage subsystem in the group unit and at the same time, can provide the security function capable of setting interface of connection in the group unit under single port of storage subsystem without changing existing processing, limitation and other functions of computer.

11 Claims, 17 Drawing Sheets

U.S. PATENT DOCUMENTS

| | | | |
|---|---|---|---|
| 4,989,205 | A | 1/1991 | Dunphy, Jr. et al. |
| 5,077,736 | A | 12/1991 | Dunphy, Jr. et al. |
| 5,124,987 | A | 6/1992 | Milligan et al. |
| 5,163,096 | A | 11/1992 | Clark et al. |
| 5,210,844 | A | 5/1993 | Shimura et al. |
| 5,237,668 | A | 8/1993 | Blandy et al. |
| 5,239,632 | A | 8/1993 | Larner |
| 5,274,783 | A | 12/1993 | House et al. |
| 5,282,247 | A | 1/1994 | McLean et al. |
| 5,297,268 | A | 3/1994 | Lee et al. |
| 5,469,564 | A | 11/1995 | Junya |
| 5,528,584 | A | 6/1996 | Grant et al. |
| 5,533,125 | A | 7/1996 | Bensimon et al. |
| 5,548,783 | A | 8/1996 | Jones et al. |
| 5,610,745 | A | 3/1997 | Bennett |
| 5,610,746 | A | 3/1997 | Ranalli |
| 5,617,425 | A | 4/1997 | Anderson |
| 5,623,637 | A | 4/1997 | Jones et al. |
| 5,634,111 | A | 5/1997 | Oeda et al. |
| 5,644,789 | A | 7/1997 | Matthews et al. |
| 5,651,139 | A | 7/1997 | Cripe et al. |
| 5,657,445 | A | 8/1997 | Pearce |
| 5,663,724 | A | 9/1997 | Westby |
| 5,748,924 | A | 5/1998 | Llorens et al. |
| 5,768,530 | A | 6/1998 | Sandorfi |
| 5,768,623 | A | 6/1998 | Judd et al. |
| 5,805,800 | A | 9/1998 | Kotani et al. |
| 5,805,920 | A | 9/1998 | Sprenkle et al. |
| 5,809,279 | A | 9/1998 | Oeda et al. |
| 5,809,328 | A | 9/1998 | Nogales et al. |
| 5,812,754 | A | 9/1998 | Lui et al. |
| 5,835,496 | A | 11/1998 | Yeung et al. |
| 5,848,251 | A | 12/1998 | Lomelino et al. |
| 5,872,822 | A | 2/1999 | Bennett |
| 5,894,481 | A | 4/1999 | Book |
| 5,913,227 | A | 6/1999 | Raz et al. |
| 5,941,969 | A | 8/1999 | Ram et al. |
| 5,941,972 | A | 8/1999 | Hoese et al. |
| 6,006,342 | A | 12/1999 | Beardsley et al. |
| 6,041,381 | A | 3/2000 | Hoese |
| 6,061,750 | A | 5/2000 | Beardsley et al. |
| 6,061,753 | A | 5/2000 | Ericson |
| 6,105,092 | A | 8/2000 | Oeda et al. |
| 6,118,776 | A | 9/2000 | Berman |
| 6,119,121 | A | 9/2000 | Zhu |
| 6,185,203 | B1 | 2/2001 | Berman |
| 6,195,703 | B1 | 2/2001 | Blumenau |
| 6,209,023 | B1 | 3/2001 | Dimitroff et al. |
| 6,219,771 | B1 | 4/2001 | Kikuchi et al. |
| 6,260,120 | B1 | 7/2001 | Blumenau et al. ........... 711/152 |
| 6,263,445 | B1 | 7/2001 | Blumenau et al. |
| 6,295,575 | B1 | 9/2001 | Blumenau et al. |
| 6,343,324 | B1 | 1/2002 | Hubis et al. |
| 6,356,979 | B1 | 3/2002 | Sicola et al. |
| 6,389,432 | B1 | 5/2002 | Pothapragada et al. |
| 6,421,711 | B1 | 7/2002 | Blumenau et al. |
| 6,421,753 | B1 | 7/2002 | Hoese |
| 6,425,035 | B2 | 7/2002 | Hoese |
| 6,425,036 | B2 | 7/2002 | Hoese |
| 6,446,141 | B1 | 9/2002 | Nolan et al. |
| 6,484,229 | B1 | 11/2002 | Ichikawa et al. |
| 6,484,245 | B1 | 11/2002 | Sanada et al. |
| 6,493,347 | B2 | 12/2002 | Sindhu et al. |
| 6,499,075 | B2 | 12/2002 | Oeda et al. |
| 6,502,162 | B2 | 12/2002 | Blumenau et al. |
| 6,523,096 | B2 | 2/2003 | Sanada et al. |
| 6,538,669 | B1 | 3/2003 | Lagueux, Jr. et al. |
| 6,553,408 | B1 | 4/2003 | Merrell et al. |
| 6,571,354 | B1 | 5/2003 | Parks et al. |
| 6,574,667 | B1 | 6/2003 | Blumenau |
| 6,591,356 | B2 | 7/2003 | McMurdie et al. .......... 711/206 |
| 6,598,174 | B1 | 7/2003 | Parks et al. |
| 6,606,695 | B2 | 8/2003 | Kamano et al. |
| 6,609,180 | B2 | 8/2003 | Sanada et al. |
| 6,633,962 | B1 | 10/2003 | Burton et al. |
| 6,640,278 | B1 | 10/2003 | Nolan et al. |
| 6,643,748 | B1 | 11/2003 | Wieland |
| 6,654,830 | B1 | 11/2003 | Taylor et al. |
| 6,665,714 | B1 | 12/2003 | Blumenau et al. |
| 6,671,776 | B1 | 12/2003 | DeKoning |
| 6,684,209 | B1 | 1/2004 | Ito et al. |
| 6,742,034 | B1 | 5/2004 | Schubert et al. |
| 6,779,083 | B2 | 8/2004 | Ito et al. |
| 6,854,034 | B1 | 2/2005 | Kitamura et al. ............ 711/112 |
| 6,947,938 | B2 | 9/2005 | Ito et al. |
| 7,024,410 | B2 | 4/2006 | Ito et al. |
| 7,051,167 | B2 * | 5/2006 | Ito et al. ..................... 711/152 |
| 7,082,503 | B2 * | 7/2006 | Ito et al. ..................... 711/152 |
| 7,353,240 | B1 * | 4/2008 | Takamoto et al. ........... 707/200 |
| 2001/0020254 | A1 | 9/2001 | Blumenau et al. |
| 2004/0054866 | A1 * | 3/2004 | Blumenau et al. ........... 711/202 |

FOREIGN PATENT DOCUMENTS

| | | |
|---|---|---|
| JP | 1181139 | 7/1989 |
| JP | 3105419 | 5/1991 |
| JP | 3152650 | 6/1991 |
| JP | 5128030 | 5/1993 |
| JP | 5181609 | 7/1993 |
| JP | 5225068 | 9/1993 |
| JP | 5324445 | 12/1993 |
| JP | 695859 | 4/1994 |
| JP | 6214863 | 8/1994 |
| JP | 8115279 | 5/1996 |
| JP | 8251101 | 9/1996 |
| JP | 63253448 | 10/1998 |
| JP | 10333839 | 12/1998 |
| WO | 0120470 A1 | 3/2001 |

OTHER PUBLICATIONS

Gibson et al, "A Case for Network-Attached Secure Disks", Document CMU-CS-96-142, School of Computer Science, Carnegie Mellon University, Sep. 26, 1996, pp. 1-19.

Gibson et al "File Server Scaling with Network-Attached Secure Disks" Proceedings of the 1997 ACM Sigmetrics International Conference on Measurement & Modeling of Computer Systems, Jun. 1997, pp. 272-284.

Van Meter III, "A Brief Survey of Current Work on Network Attached Peripherals", ACM SIGOPS, Operating Systems Review, v. 30, n. 1, Jan. 1996, pp. 63-70, Internet copy.

"Fibre Channel Physical and Signaling Interface (FC-PH)" Rev. 4.3 Jun. 1, 1994.

Performance Efficient Multiple Logical Unit Number Mapping for Redundant Array of Independent Disks, IBM Technical Disclosure Bulletin, May 1996, pp. 273-274.

J. Wilkes, et al "The HP AutoRAID Hierarchical Storage System", ACM Transactions on Computer Systems, vol. 14, No. 1, Feb. 1996, pp. 108-136.

E. Lee, et al, Petal: Distributed Virtual Disks, Proceedings of the 7th Int'l Conf. On Architectural Support for Programming Languages and Operating Systems, ASPLOS VII, ACM, 1996, pp. 84-92.

FreeBSD Hypertext Man Pages, Jan. 12, 2005, 7pgs.

* cited by examiner

| WWN | LUN |
|---|---|
| 01234567 89ABCDEF | 0 1 2 |
| 01234567 89ABCDEE | 3 4 7 |
| 01234567 89ABCDED | 5 6 |
| ... ... ... | ... ... ... |
| 01234567 89ABCDBB | 0 1 7 |
| 01234567 89ABCDB0 | 3 5 6 |
| 01234567 89ABCDB1 | 2 4 |

701, 702, 703, 704, 705, 706, 707

| WWN | LUN |
|---|---|
| 01234567 89ABCDAA | 0 1 2 3 4 5 |
| 01234567 89ABCDA0 | 6 7 8 9 10 |
| 01234567 89ABCDA1 | 11 12 13 14 15 |

FIG. 11

| | GID (1102) | | WWN (1101, 1103) | LUN (1104) |
|---|---|---|---|---|
| 1105 | GROUP A=F001 (OS KIND 1) | 1112<br>1113<br>1114 | 01234567 89ABCDEF<br>01234567 89ABCDEE<br>01234567 89ABCDED | 0 1 2 3<br>→REFER TO STORAGE AREA 「0 1 2 3」 |
| 1106 | GROUP B=F002 (OS KIND 2) | 1115<br>1116<br>1117 | 01234567 89ABCDXX<br>01234567 89ABCDYY<br>01234567 89ABCDZZ | 0 1 2 3<br>→REFER TO STORAGE AREA 「60 61 62 63」 |
| | ... ... ... | | ... ... ... | ... ... ... |
| 1107 | GROUP C=F003 (MIXTURE OF OS KINDS 3 & 4) | 1118<br>1119<br>1120<br>1121 | 01234567 89AB33DD<br>01234567 89AB33CC<br>01234567 89AB44BB<br>01234567 89AB44AA | 0 1 2 3 4 5<br>→REFER TO STORAGE AREA 「7 11 70 79 87 119」 |
| | ... ... ... | | ... ... ... | ... ... ... |
| 1108 | GROUP D=F004 (MIXTURE OF OS KINDS 5 & 6) | 1122<br>1123 | 01234567 89ABCD10<br>01234567 89ABCD2E | 50 51 62<br>→REFER TO STORAGE AREA 「40 99 100」 |
| | ... ... ... | | ... ... ... | ... ... ... |
| 1109 | GROUP E=F005 (ONE MEMBER OF OS KIND 1) | 1124 | 01234567 89ABCD31 | 0 1<br>→REFER TO STORAGE AREA 「4 5」 |
| | ... ... ... | | ... ... ... | ... ... ... |
| 1110 | GROUP F=F006 (OS KIND 7) | 1125<br>1126 | 01234567 89ABCD46<br>01234567 89ABCD4E | 0~255<br>→REFER TO STORAGE AREA 「0~255」 |
| | ... ... ... | | ... ... ... | ... ... ... |
| 1111 | GROUP G=F007 (OS KIND 7) | | 01234567 89ABCD46<br>01234567 89ABCD4E | 0~255<br>→REFER TO STORAGE AREA 「256~512」 |
| | ... ... ... | | ... ... ... | ... ... ... |
| 1127 | GROUP H=F008 (OS KIND 8 FLOOR 1) | 1129<br>1130 | 01234567 AAABCD46<br>01234567 BBABCD4E | 0 1<br>→REFER TO STORAGE AREA 「10 11」 |
| 1128 | GROUP I=F009 (OS KIND 8 FLOOR 2) | 1131<br>1132 | 01234567 CCABCD46<br>01234567 DDABCD4E | 4 5<br>→REFER TO STORAGE AREA 「10 11」 |

FIG. 12

| | | GID | WWN | LUN |
|---|---|---|---|---|
| 1205 | | GROUP A (GID=F001) | 1208 — 01234567 89ABCAAC | 0 1 2 3 4 |
| | | | 1209 — 01234567 89ABCAA0 | |
| | | | 1210 — 01234567 89ABCBA1 | |
| 1206 | | GROUP B (GID=F002) | 1211 — 01234567 89ABCBBE | 0 1 2 |
| | | | 1212 — 01234567 89ABCDBF | |
| 1207 | | GROUP C (GID=F003) | 1213 — 01234567 89ABCDCC | 0 1 2 3 |
| | | | 1214 — 01234567 89ABCDC0 | |
| | | | 1215 — 01234567 89ABCDC1 | |
| | | ... ... ... | ... ... ... | ... ... ... |

Column labels: 1202 (GID), 1201 (WWN), 1203, 1204 (LUN)

FIG. 16

"WWN-S-ID-GID CONVERSION TABLE" 1601

| S_ID | WWN | GID |
|---|---|---|
| FFFF01 | 01234567 89ABCDEF | F001 |
| FFFF02 | 01234567 89ABCDEE | F0EF |
| FFFF03 | 01234567 89ABCAAC | F002 |
| FFFF04 | 01234567 89ABCAA0 | F002 |
| FFFF05 | 01234567 89ABCBA1 | F0C1 |
| FFFF06 | 01234567 89ABCBBE | F01F |
| FFFF07 | 01234567 89ABCDBF | F0EF |
| FFFF08 | 01234567 89ABCDCC | F006 |
| ... | ... | ... |

SECURITY FOR LOGICAL UNIT IN STORAGE SUBSYSTEM

The present application is a Continuation-in-part of application Ser. No. 10/902,795, filed Aug. 2, 2004, now U.S. Pat. No. 7,082,503; which is a continuation of application Ser. No. 10/076,553, filed Feb. 19, 2002, now U.S. Pat. No. 6,779,083 and claims priority from Japanese Patent Application No. 2001-213642; and is a Continuation-in-part of application Ser. No. 11/330,261, filed Jan. 12, 2006; which is a continuation of application Ser. No. 10/737,477, filed Dec. 15, 2003, now U.S. Pat. No. 7,024,410; which is a continuation of application Ser. No. 09/561,404, filed Apr. 27, 2000, now U.S. Pat. No. 6,684,209 and claims priority from Japanese Patent Application Reference No. 2000-010115, filed Jan. 14, 2000 the entire disclosures of each of the above are incorporated herein by reference.

BACKGROUND OF THE INVENTION

1. Filed of the Invention

This invention relates to a storage subsystem to be accessed from a computer. More particularly, this invention relates to an access to a logical unit inside a storage subsystem.

2. Description of the Related Art

Fiber Channel protocol has been standardized in recent years and SAN (Storage Area Network) environment using this protocol as the infrastructure has become complicated and diversified. As a result, the number of computers connected to the storage subsystem and their kinds, or a kind of OS (Operation System), and the number of logical units required for the storage subsystem have drastically increased. Further, an environment in which various protocols other than the Fiber Channel such as SCCI, ESCON, TCP/IP, iSCSI, etc, can be simultaneously used has been set up. Here, the term "computer" represents those electronic appliances having electronic circuits that can be connected to a network.

Such an environment means that various kinds of computers gain access to one storage subsystem. The term "computer" includes so-called large-scale host computers and compact personal computers. When these various computers gain access to the storage subsystem, the expression such as "host gains access" and "host gains access" is used herein appropriately.

Under such circumstances, the security function to the storage subsystem resources that relies on OS, middleware and application software on the host side according to the prior art technology is not sufficient in some cases, and the necessity for a higher LUN security function for preventing an illegal access to logical units (hereinafter abbreviated as "LU" from time to time) has increased rapidly. Incidentally, the term "LUN" represents the logical unit number inside the storage subsystem.

JP2000276406 is one of the references that describe means for accomplishing the security function to the storage subsystem resources (logical units). The method of this reference accomplishes the security function as to access approval/rejection to LUN inside the storage subsystem but cannot cope with diversified computers that gain access to a single port. In the practical operation, therefore, the method limits the kind of host computers that can be managed under the single port to only one kind. This limitation in the practical operation cannot follow drastic expansion of the SAN environment described above.

To provide the logical units inside the storage subsystem to computers with the LUN security function, it is necessary to define a greater number of logical units than before under the single port of the storage subsystem and to give the logical units to host computers having a plurality of OS, a plurality of computers having mutually different kinds of OS, and other computers.

Nonetheless, the LUN security function in the existing storage subsystems is not free from the limitation that the kind of OS must be the same even when a large number of computers that can be managed under the single port exist. Furthermore, such a function generally has another limitation that setting of connection interface for the host computers that can be set to the single port must be one. A method for solving these problems would be the one that simply defines a large number of logical units under the single port of the storage subsystem, and divides and gives the logical units as such to a plurality of kinds of OS that gain access to this port.

However, various OS of existing computers have a specification such that when access cannot be made to a logical unit zero (LU0) of a storage subsystem, inquiry is not at all made thereafter for subsequent LU of the same system after LU1 next to LU0. Incidentally, according to the SCSI-2 standard, one system includes 8 LU, and LU0 to LU7 belong to the same system.

Therefore, when the logical unit number (LUN) inside the storage subsystem is as such given to the host computer, the computer cannot correctly recognize the logical unit as expected on the setting side of the logical units.

Various OS of existing computers mostly set the upper limit of logical unit numbers recognizable under the single port to 256. In other words, even when 257 or more of logical unit number are disposed, the computers cannot recognize the logical units, and this also renders the problem when the logical units inside the storage subsystem are given to the computer under the single port.

On the other hand, when a strong LUN security function is provided in storage subsystems, the most reliable method would be the one that serially checks access approval/rejection of the object LU whenever computers transmit commands. However, this creates the problem of performance because the processing time in the storage subsystem (overhead for security check) becomes greater.

It is therefore a first object of the invention to provide a storage subsystem that groups computers in accordance with OS or into an arbitrary kind without changing existing processing, limitation and other functions of the computers, limits logical units to which the computers so grouped can gain access, and makes it possible to set them on interface in the group unit and to provide a LUN security function under a single port of the storage subsystem.

It is a second object of the invention to provide the security function described above with high-speed access judgment logic of the storage subsystem.

SUMMARY OF THE INVENTION

A storage subsystem according to the invention includes a management table describing correspondence of information (WWN: WorldWide Name) for primarily identifying each computer (inclusive of host computers), information (GID: Group ID) for identifying a group to which the computer belongs and a logical unit number (LUN) inside the storage subsystem for which access from the computer is permitted; a nonvolatile memory for storing the management table; a management table describing correspondence of a management number (S-ID) dynamically allocated when the computer executes login to the storage subsystem and remaining effective until logout, information (WWN) for primarily identifying the computer and information (GID) for identifying the group to which this host computer belongs; a nonvolatile memory for storing the management table; at least one input terminal for setting these management table; at least one storage device; a storage control unit for controlling write/read of data to and from the storage device; and logical units (LUN) corresponding to storage areas of the storage device.

In this storage subsystem, a user can make setting of accessible LUN and setting on a connection interface in an arbitrary group unit of computers under a single port without changing existing processing, limitation and other functions of the computers. Therefore, this storage subsystem can accomplish an access control function, that is, a LUN security function, for computer groups having a plurality of kinds of OS under a single port.

Since this storage subsystem uses GID as identification information on the basis of S-ID allocated at the time of login in place of host identification information WWN, the time required for judging accessible LUN is shorter than when WWN is used, and a high-speed judgment can be made.

Other objects, features and advantages of the invention will become apparent from the following description of the embodiments of the invention taken in conjunction with the accompanying drawings.

BRIEF DESCRIPTION OF THE DRAWINGS

FIG. 11 shows a format of a "LUN access management table" and its first utilization example according to the embodiment of the invention;

FIG. 12 shows a format of a "LUN access management table" and its second utilization example according to the embodiment of the invention;

FIG. 16 shows a first utilization example of the "WWN-S-ID-GID conversion table" format according to the embodiment of the invention;

DESCRIPTION OF THE EMBODIMENT

The present invention utilizes by way of example a Fiber Channel as an example of an interface protocol used between a storage subsystem and a computer and an SCSI command as an example of a command set operating on the interface protocol. Incidentally, the invention is not limited to the combination of the Fiber Channel and the SCSI command but can be applied to any combination of protocols and interfaces so long as they can provide the functions/mechanisms of login, inquiry, logout, and so forth.

A first embodiment of the invention will be given. Initially, the features associated with the invention on the protocol of the Fiber Channel will be explained.

A device having an interface of the Fiber Channel is referred to as a "node", and a physical terminal corresponding to a practical interface is referred to as a "port". The node can have one or more ports. The number of ports that can simultaneously participate in the overall system of the Fiber Channel is the address number of maximum 24 bits, that is, 224 (16,777,216). Hardware that mediates these connections is referred to a "fabric". In practice, transmitting ports and destination ports need only operate by taking information related with the mutual ports into account but without the necessity for taking the fabric into account.

Each of the nodes and ports stores identification data that is unique worldwide and is allocated by a standardization organization (IEEE) in accordance with a predetermined rule. They correspond to MAC addresses familiar in the past such as TCP/IP, and are hardware-wise fixed addresses. The addresses include two kinds, i.e. N-Port-Name and Node-Name, each having an eight-byte size. N-Port-Name is a value (hardware address) unique to each port and Node-Name is a value (hardware address) unique to each node. Since these values are unique worldwide, they are called "WWN (World Wide Name)" as the addresses capable of primarily identifying the ports. In Examples of the invention, the term "WWN" represents N-Port-Name.

Figure 2:
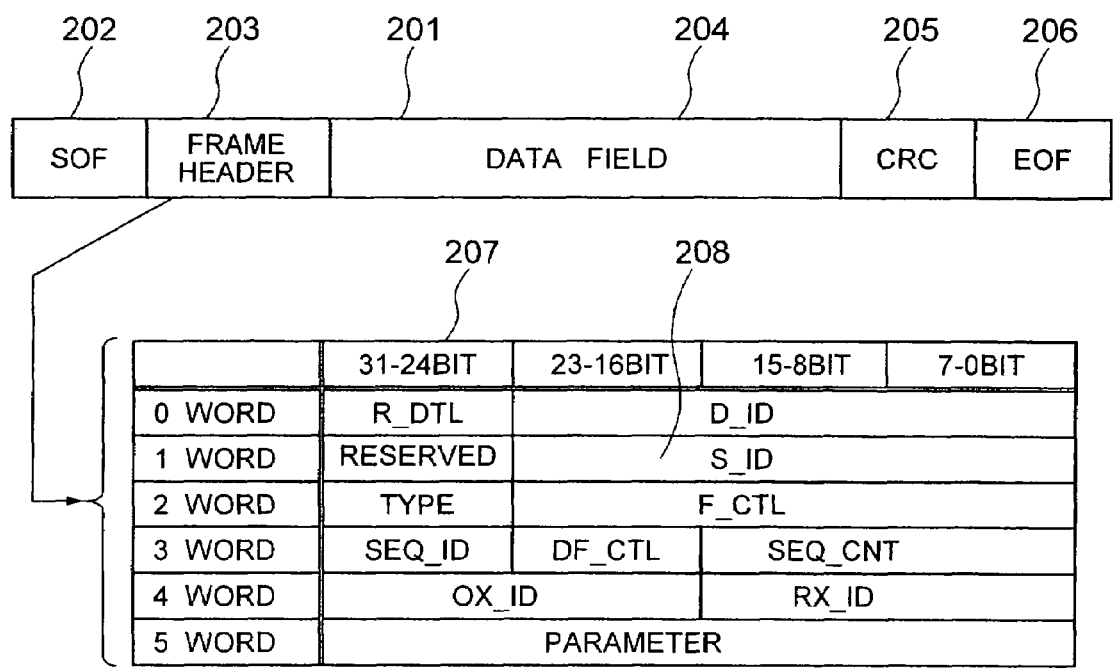
FIG. 2 shows in detail a frame format and its frame header in the embodiment of the invention.

In the Fiber Channel, communication is executed by information of a signal level referred to as "Ordered Set" and logical information having a fixed format referred to as a "frame". FIG. 2 shows a structure of the frame. The frame 201 has 4-byte identification data representing the start of the frame and called "SOF" (Start Of Frame) 202, a 24-byte frame header 203 characterizing control of a link operation and the frame, a data field 204 as a data part as the object to be practically transferred, a 4-byte cyclic redundancy code (CRC) 205 and a 4-byte identification data called "EOF" (End of Frame) 206 and representing the end of the frame. The data field 204 is variable within 0 to 2,112 bytes.

Next, the content of the frame header will be explained. Reference numeral 207 represents a structure of the frame header. Here, the explanation will be given on only S-ID 208 corresponding to 0 to 23 bit areas of the first word in the detailed structure 207 of the frame header 203. S-ID (Source ID) 208 is 3-byte address identification data for identifying the port transmitting the frame, and has a value effective for all the frames to be transmitted and received.

FC-PH as one of the standard sets of the Fiber Channel stipulates that the fabric allocates S-ID during the initialization procedure. The allocated value depends on N-Port-Name or Node-Name of each port.

Figure 3:
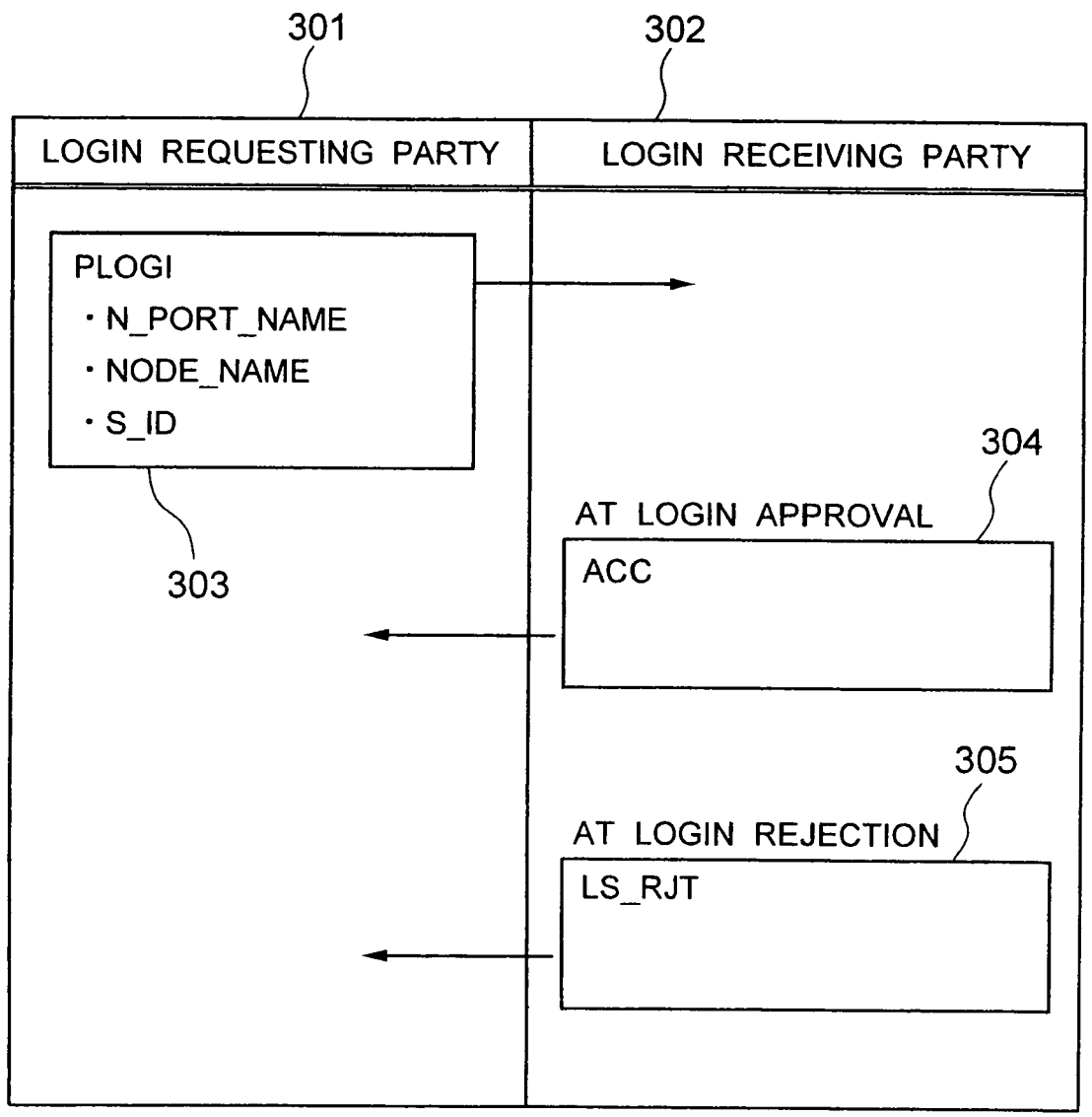
FIG. 3 shows a login process in the embodiment of the invention.

Next, the login procedure of equipment of the transmitting party and the destination party for mutually exchanging information on the basis of the Fiber Channel protocol will be described. FIG. 3 shows the exchange of information between the transmitting party (login requesting party) 301 and the destination party (login receiving party) 302.

The explanation will be given on login of Class 3 though several kinds of login procedures of the Fiber Channel are available. The login requesting party transmits a PLOGI frame 303 to the login receiving party. This frame contains N-Port-Name, Node-Name, S-ID and other information of the login requesting party.

Equipment at the destination takes out the information contained in this frame. When approving the login, this equipment transmits a frame called "ACC304" to the login requesting party. To reject login, on the other hand, it transmits a frame called "LS-RJT305" to the login requesting party.

When detecting the response of the ACC frame to the PLOGI frame transmitted by the login requesting party, the login requesting party knows that login proves successful, and can now start an I/O process such as data transfer. When receiving LS-RJT, on the other hand, the login requesting party knows that login is not established, and the I/O process to the corresponding login receiving party cannot be executed.

Though the explanation is given on the login operation of Class 3, the information in other login processes that can be transmitted from the login requesting party to the login receiving party similarly contains N-Port-Name, Node-Name and S-ID.

Next, Inquiry command that is a standard command and is always supported in the SCSI command set will be explained.

Figure 4:
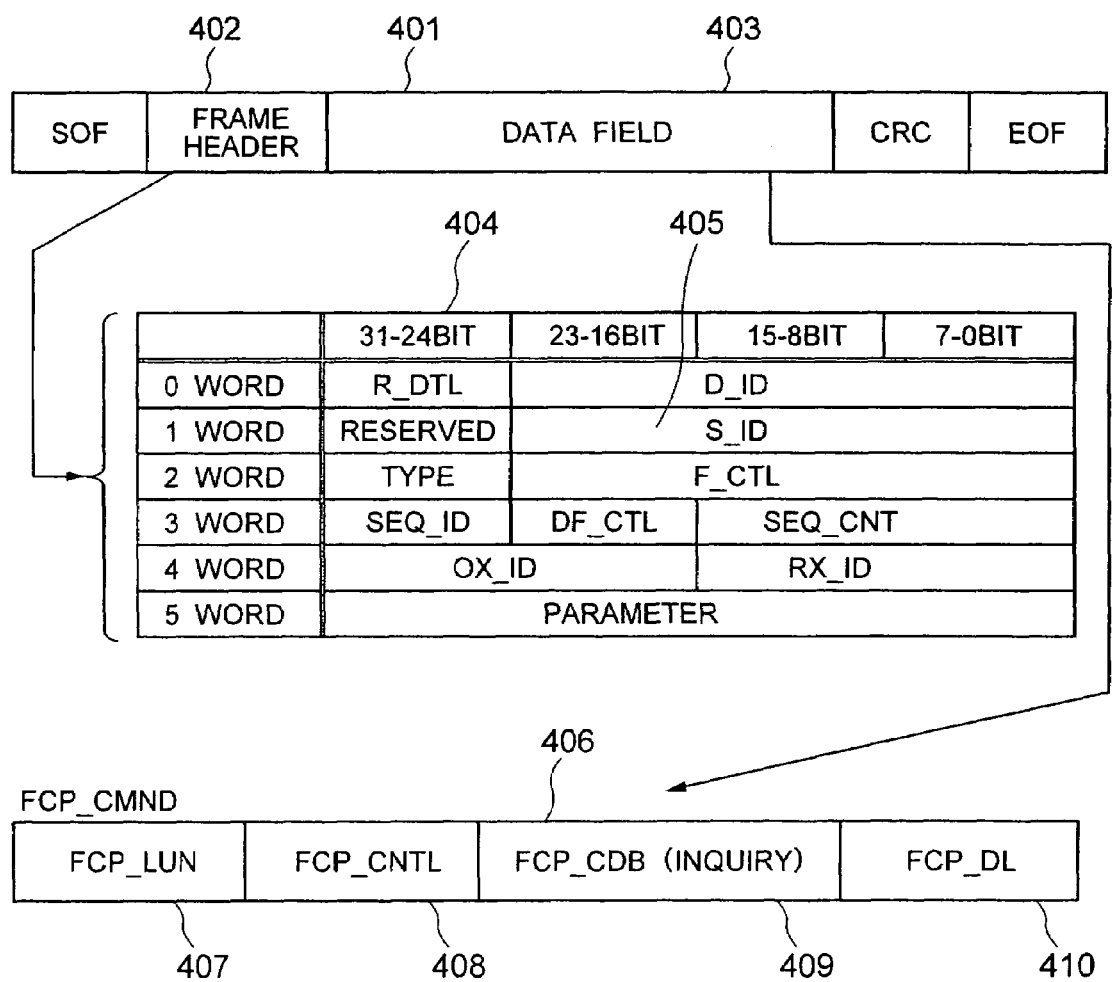
FIG. 4 shows in detail a frame format when an Inquiry command is transmitted in the invention.

The Inquiry command is the one that inquires a logical unit as the object of the I/O process its package state and its preparation condition. The inquiry command 401 as per FIG. 4 includes at least a frame header 402 and data field 403. FIG. 4 shows a detailed structure 404 of the data field 403 when the frame of the Fiber Channel standard transmits the Inquiry command defined by the SCSI standard. The basic structure of the frame and the frame header is analogous to the one shown in FIG. 2. Therefore, the structure contains S-ID405.

The data field 403 includes areas called FCP-LUN 407, FCP-CNTL 408, FCP-CDB 409 and FCP-DL 410 as represented by an FCP-CMND format 406.

FCP-LUN 407 stores identification data of a logical volume associated with the port of the frame transmission destination that the frame transmitting party is to inquire. Incidentally, the term "logical volume" represents a storage area virtually divided and numbered for convenience sake for a storage device (physical volume) as a visible entity. This identification data is called "LUN" (Logical Unit Number).

FCP-CDB 409 stores command information called "command description block" (CDB) of SCSI when the SCSI command set is used. This FCP-CDB 409 stores the Inquiry command information of SCSI, and the information is transferred with FCP-LUN 407 to the frame receiving party.

In other commands supported by the SCSI command set such as Write command and Read command, too, the frame has the structures of 401 and 406 in the same way as the Inquiry command. Therefore, these commands also contain S-ID and CP-LUN that are essential for executing the present invention.

Figure 5:
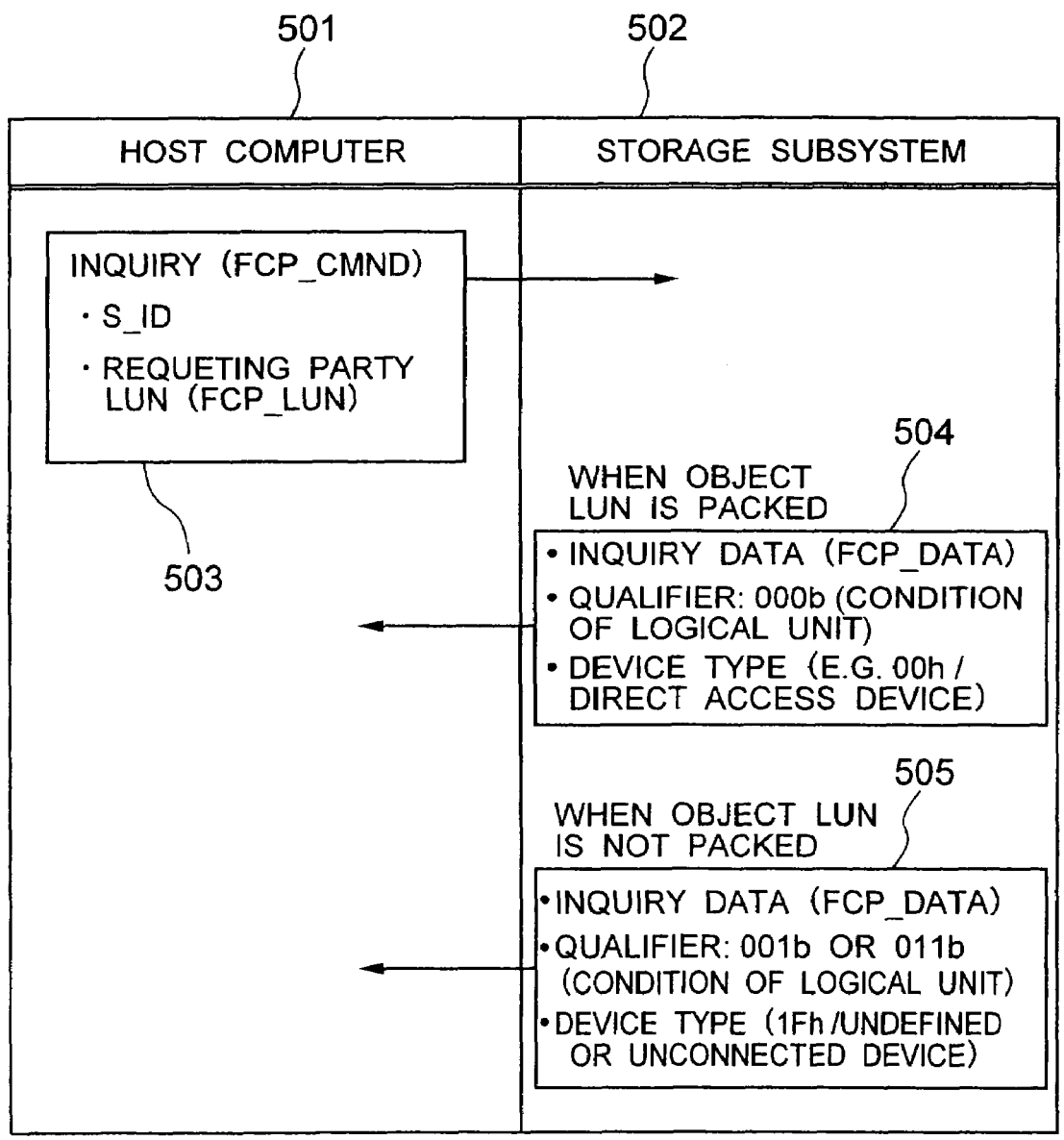
FIG. 5 shows an access inquiry sequence to a logical unit by the Inquiry command in the embodiment of the invention.

FIG. 5 shows the inquiry sequence of the logical unit by using the Inquiry command.

A host computer 501 that is to gain access to the logical unit transmits the frame 503 storing the Inquiry command to a storage subsystem 502 having the logical unit to be accessed. This frame contains S-ID of the host computer and LUN as the identification data of the logical unit to be inquired. Here, LUN can be set into the format of the Inquiry command information inside FCP-CDB besides the FCP-LUN area. The effect obtained is the same when which of these values is used. This embodiment uses the value stored in FCP-LUN 407 as the LUN value.

Receiving the frame containing the Inquiry command, the storage subsystem 502 prepares Inquiry data necessary for the inquiry and transmits a frame 504 containing the Inquiry data so generated to the host computer. In this instance, the frame storing the Inquiry data is called "FCP-DATA". When the storage subsystem sets (504) either a qualifier 000 (binary digit) or device type 00 to 09 (hexadecimal digit) for the logical unit inquired, the host computer that receives this Inquiry data can subsequently generate I/O for this logical unit.

As represented by 505, on the other hand, when the storage subsystem sets a qualifier 001 (binary digit) or 011 (binary digit) or device type 1F (hexadecimal digit), the host computer that receives this Inquiry data 505 recognizes that subsequent generation of I/O is not possible. Therefore, it can be understood that when the storage subsystem controls the qualifier and the device type code stored in the Inquiry data, approval/rejection of the access from the host computer to the logical unit of the storage subsystem can be controlled.

As described above, the method of generating the frame is basically the same in the Write command and the Read command besides the Inquiry command. Therefore, when the storage subsystem on the side of the transmission destination detects S-ID and LUN designated by the transmitting host computer as illegal, access rejection can be made.

Subsequently, the flow of the processing in the invention will be described in detail.

Figure 1:
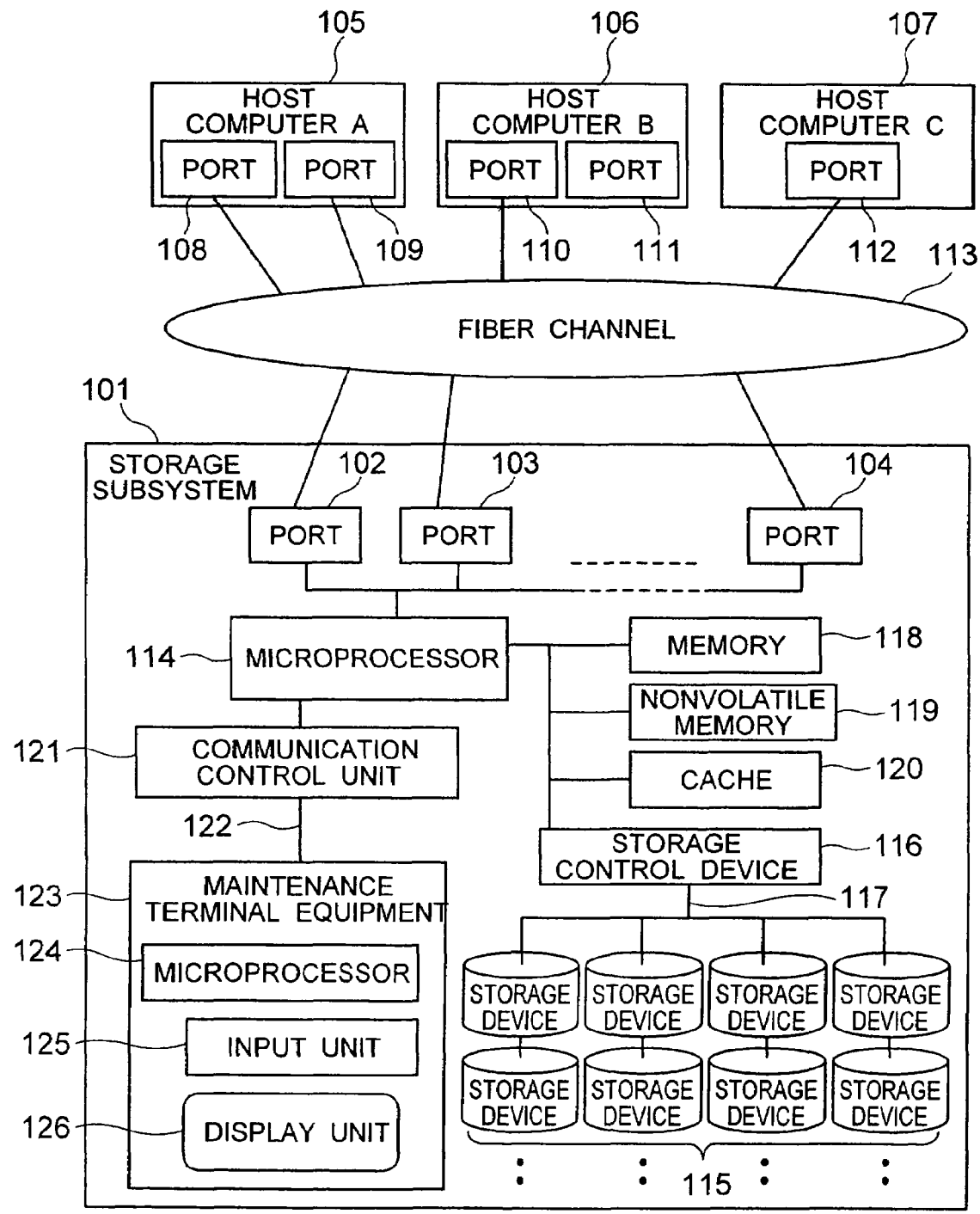
FIG. 1 is a structural view of hardware in an embodiment of the present invention.

FIG. 1 shows an apparatus construction of an embodiment of the invention. A storage subsystem 101 includes ports 102 to 104 for Fiber Channel interface, and is physically connected to host computers 105 to 107 through the Fiber Channel interface. The host computers 105 to 107, too, have ports 108 to 112 for the Fiber Channel interface. The host computers 105 to 107 can communicate with the storage subsystem 101 by using the Fiber Channel protocol. Some host computers have a plurality of Fiber Channel ports such as 105 and 106 while the other has only a single Fiber Channel port as 107. Several kinds of connection forms (topology) exist as the connection form between the storage subsystem 101 and the host computers 105 to 107 such as Point-to-Point, arbitration loop connection, fabric connection, and so forth. Since the present invention does not depend on the connection form, however, the channel form is described merely as the Fiber Channel 113.

First, the storage subsystem 101 includes a microprocessor 114 for executing various arithmetic operations and processing, and includes also a plurality of storage unit groups 115, a storage control device 116 for controlling data write/read to and from these storage unit groups, and a bus 117 for connecting the storage unit groups 115 to the storage control device 116.

Further, the storage subsystem 101 includes a memory 118 used as a work area of various arithmetic operations and processing and a non-volatile memory 119 for preserving various management information and management tables.

The storage subsystem 101 further includes a cache 120 as means for improving the response to the host computer.

The storage subsystem 101 includes a communication control unit 121 and is connected to maintenance terminal equipment 123 through a communication line 122.

The maintenance terminal equipment 123 includes therein a microprocessor 124, an input unit 125 as an interface with users and a display unit 126 for outputting a processing result. The user can set several tables defined in this embodiment through the input unit 125.

A microprocessor 114, a memory 118, a nonvolatile memory 119 and a communication control unit 121 may have a discrete construction as shown in FIG. 1 or may be disposed inside the storage control device 116. When they cannot be arranged inside the storage control device 116 due to the physical shape (size) of the cache 120, they are disposed outside and are connected to the outside through predetermined paths (lines). In this case, the storage control device 116 is disposed immediately below the ports 102 to 104 and is connected to each port through a predetermined path. The storage control device 116 can substitute the functions exhibited by the microprocessor 114.

The maintenance terminal equipment 123 connected to the communication control unit 121 may be arranged (always connected) inside the storage subsystem 101 or may be connected (maintenance connection) through the communication line 122 only when necessary.

Figure 6:
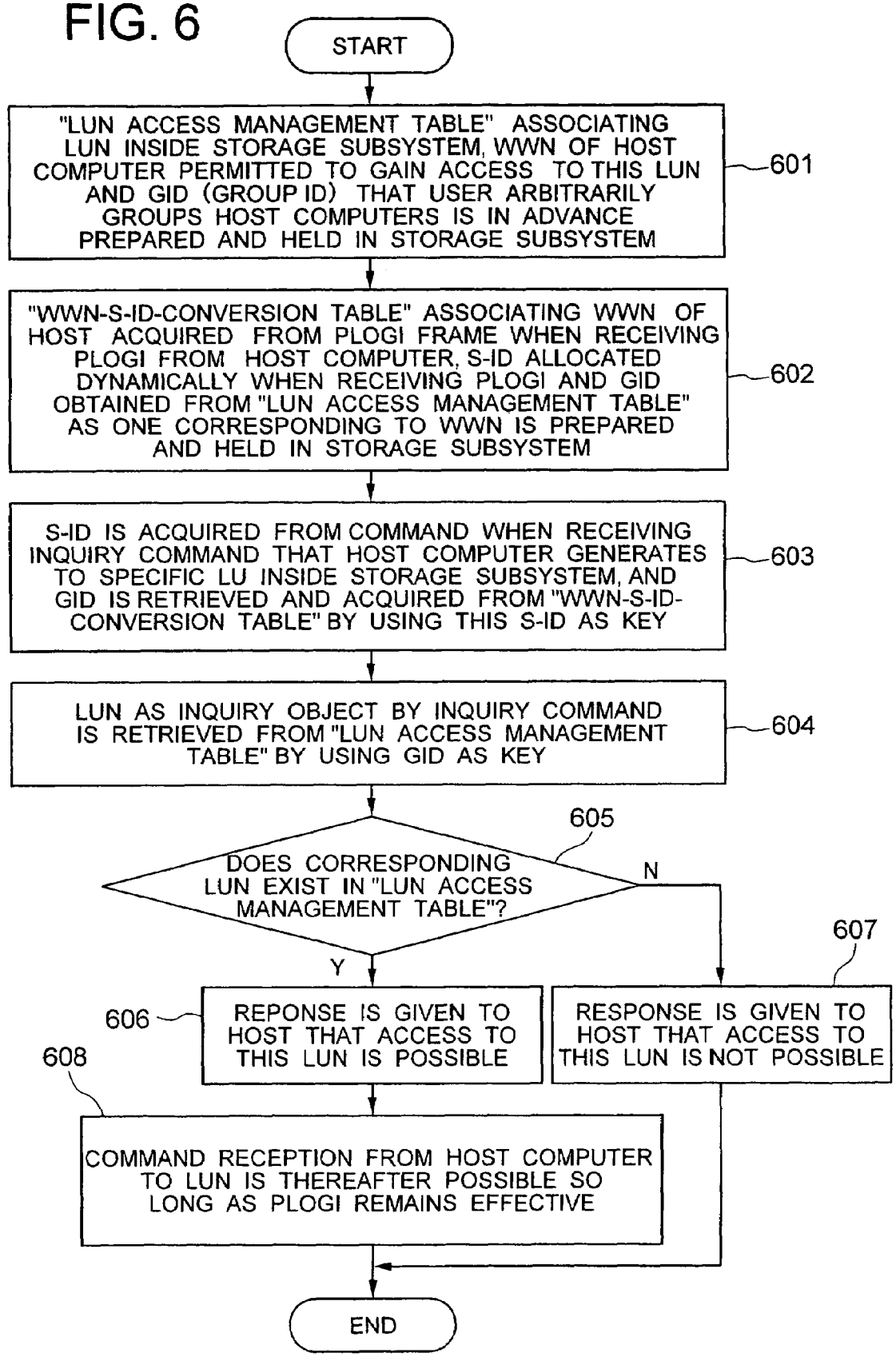
FIG. 6 is a flowchart showing an outline of a process sequence of LUN security in the embodiment of the invention.

FIG. 6 shows the outline of the flow of the processing of this embodiment.

In Step 601, a user generates a "LUN access management table", that associates mutually LUN (Logic Unit Number) stipulating the logical units (LU) existing inside the storage subsystem, WWN (N-Port-Name) of the host computers that may gain access to this LUN and GID (Group ID) allocated to the host computers when they are grouped into arbitrary groups, through the input unit 125 of the maintenance terminal equipment 123. This table is held by the nonvolatile memory 119 inside the storage subsystem. LUN of this table is seen in each host computer. WWN of each host computer is known already.

In Step 602, when each host computer executes login to the storage subsystem on the basis of the Fiber Channel protocol, the storage subsystem segments WWN of this host computer and S-ID from a PLOGI frame, retrieves simultaneously GID, to which this WWN belongs, from the LUN management access table generated by the user, generates a "WWN-S-ID-GID conversion table" and holds the table on the nonvolatile memory 119.

When GID, to which WWN belongs, cannot be retrieved from the LUN access management table, it means that the user does not define the host computer group to which this WWN belongs. In this case, therefore, a non-defined ID is registered to GID of the WWN-S-ID-GID conversion table corresponding to this WWN. The storage subsystem executes this operation for all the PLOGI frames.

In Step 603, the storage subsystem receives the frame inclusive of the Inquiry command that each host computer transmits in order to know the condition of the logical units inside the storage subsystem. Receiving this frame, the storage subsystem segments S-ID from the header of the frame and LUN as the object of the Inquiry command from the data field. Subsequently, the storage subsystem retrieves the WWN-S-ID-GID conversion table by using S-ID as the key and acquires GID corresponding to this S-ID.

In Step 604, the storage subsystem retrieves LUN as the object of the Inquiry command from the LUN access management table by using the resulting GID as the key. In Step 605, whether or not LUN corresponding to GID is acquired as a result of Step 604 is judged. When it is acquired, that is, when LUN corresponding to GID exists on the LUN access management table, the access to LUN by the host computer group to which the present host computer belongs is permitted as per Step 606. When LUN does not exist on the table, on the other hand, the access to LUN by the host computer group to which the present host computer belongs is rejected as per Step 607.

When the access to LUN by the host computer is permitted as a result of Step 605, the storage subsystem executes in Step 606 setting of LUN package (setting that access is possible) to the Inquiry command generated by the host computer, and then transmits the Inquiry data. When the access to this LU is rejected as a result of Step 605, on the other hand, the storage subsystem executes in Step 607 setting of LUN non-package, that represents that setting is not permitted, to the Inquiry command generated by the host computer, and transmits the Inquiry data.

Receiving the Inquiry data, the host computer analyzes the frame. When it recognizes as a result of analysis that the access to virtual LUN of the storage subsystem is permitted, the host computer can subsequently continue to generate the command (I/O request) to this LUN. In this case, the storage subsystem can continuously receive the command to LU while login from the host computer remains effective as expressed by Step 608.

On the other hand, recognizing that the access to LUN is rejected, the host computer does not again access to LU so long as login to the storage subsystem remains effective. Hereinafter, a method for controlling access approval/rejection from the host computer to specific LUN inside the storage subsystem will be called "LUN security in the invention".

Next, the technical problems will be explained in further detail with reference to FIGS. 7 to 10, and the invention will be explained with reference to FIG. 11 and so forth.

First, generation of "LUN access management table" in Step 601 will be explained. It will be assumed that LUN security in the invention is managed for each port of the storage subsystem and that the host computer gains access to LU inside the storage subsystem through this port of the storage subsystem. The most simplified method disposes a table 701 shown in FIG. 7, that defines correspondence between WWN as the information for primarily identifying the host computer and LUN permitting the access of the host computer, inside the storage subsystem. This can be done without any problem when the host computer and the storage subsystem are connected through a dedicated line, and the function can be accomplished.

Figures 7, 8:
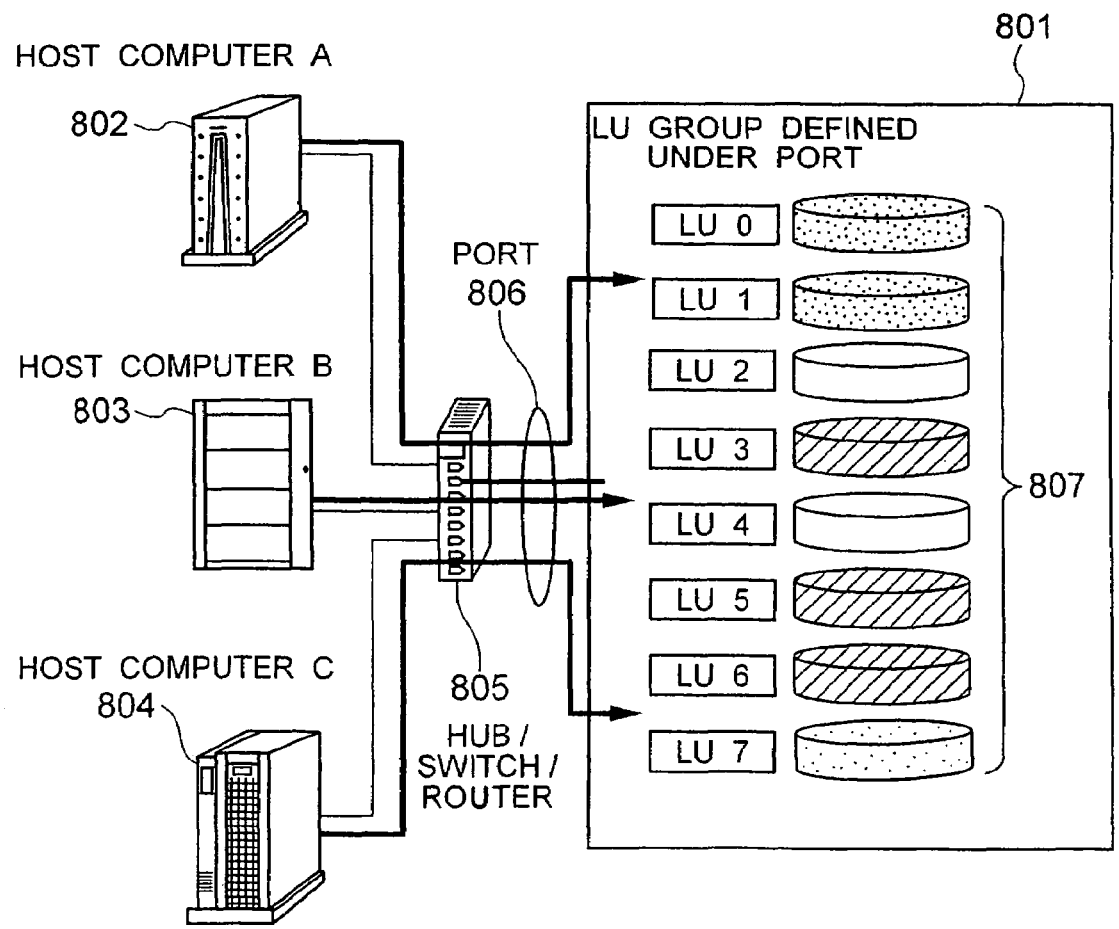
FIG. 7 shows a format of an incomplete "LUN access management table" and its first example when the invention is not utilized.
FIG. 8 visually shows the state of FIG. 7.

In Table 701, the storage areas inside the storage subsystem are arbitrarily numbered under a single port and the logical unit number (LUN) are as such allocated to WWN of the host computers. In FIG. 7, the host computer WWN702 is permitted to gain access to only LU0 to LU2. The host computer WWN703 is permitted to gain access to only LU3 and LU4 and the host computer WWN704, to only LU5 and LU6.

Therefore, the host computers other than WWN702 cannot gain access to LU0 to LU2 and LUN security of the invention can be accomplished.

However, under the latest complicated environment of use where devices such as hubs corresponding to the fiber channel and switches are interposed between the host computers and the storage subsystem, the table of 701 alone is not sufficient. For, when the host computers in most of the existing host computers fail to gain access to LU0 of the storage subsystem connected to the host computers, the host computers do not at all make any inquiry for LU of the same system after LU0

(since one system comprises 8 LU according to the SCSI-2 standard, LU0 to LU7 form the same system).

When the access is made from the host computers, the stipulation method of the table 701 does not permit the host computers 703 and 704 to gain access to LU0 though LUN that permits the access is stipulated. In consequence, these host computers cannot refer to LUN that are stipulated by the table 701. Such a phenomenon remarkably lowers utilization efficiency of an apparatus capable of providing abundant storage resources such as a disk array apparatus, and waste of the storage resources develops.

If the host computers 703 and 704 are permitted to gain access to LU0 to prevent such a phenomenon, exclusion of LU0 disappears and security is not insured. Provided that the access to LU0 is permitted, too, it is difficult for the host computers 703 and 704 to share LU0 due to the difference of formats of OS if they have different OS.

It will be assumed in FIG. 7, on the other hand, that a group of host computers having WWN705 to 707 and capable of inquiring the existence to all LUN exist even when the definition of LU0 does not exist under the port of the storage subsystem. Here, the host computer of WWN705 is permitted to gain access to only LU0, 1 and 7, the host computer of WWN706, to only LU3, 5 and 6, and the host computer of WWN707, to only LU2 and 4.

FIG. 8 visually shows this condition. Host computers 802 to 804 correspond to the host computers having WWN705 to 707 shown in FIG. 7. The host computers 802 to 804 are connected to the same port 806 of the storage subsystem through a hub, switch or router 805 corresponding to the Fiber Channel. When access object LUN is defined without a plan for each host computer 802 to 804 or LUN different from LUN previously allocated is allocated as the access object under such a use environment, the representation method of LUN loses flexibility in the storage subsystem such as 801 that represents LUN arbitrarily numbered under the same port inside the storage subsystem as such to the host computers, and LUN of the subordinates to this port appear as being dispersed as in the LU group 807 and become difficult to manage for use.

On the other hand, some of the latest host computers recognize nine or more LU under the subordinates to one port of the storage subsystem. When LUN security is executed between such host computers and the host computers that support only eight LUN such as LU0 to 7 under one port of the storage subsystem as in the prior art, the following problems arise.

Figures 9, 10:
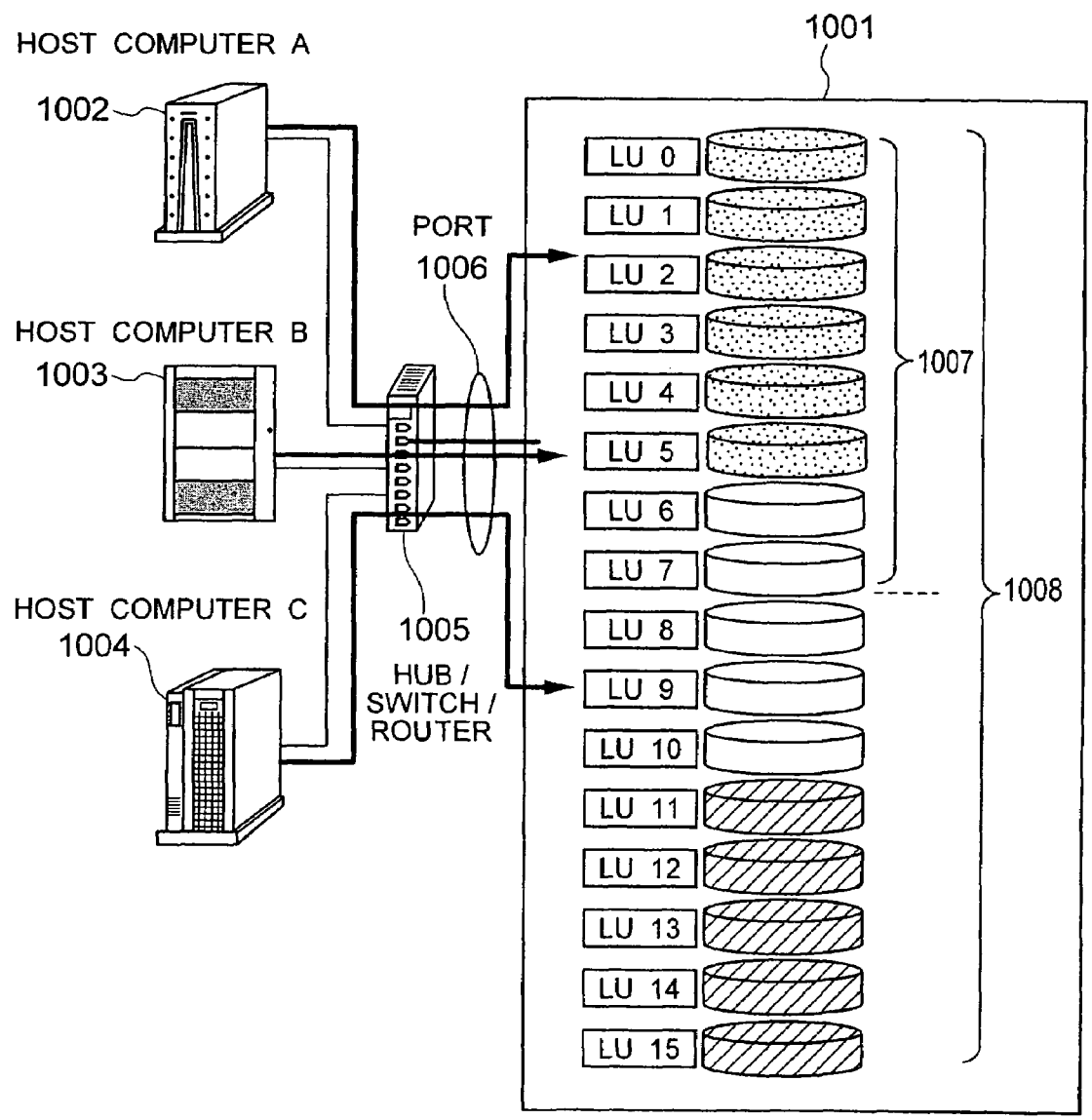
FIG. 9 shows a format of an incomplete "LUN access management table" and its second example when the invention is not utilized.
FIG. 10 visually shows the state of FIG. 9.

Referring to FIG. 9, the explanation will be given on the case where the host computers having WWN902 and 904 have a mechanism for inquiring the existence to each LU though LU0 does not exist under the port of the connected storage subsystem 1001, and recognize up to 16 LU under the port of the connected storage subsystem 1001.

It will be assumed that the host computer having WWN903 can inquire the existence to each LU though LU0 does not exist under the port of the connected storage subsystem 1001 but the range of LU that can be supported is 8, that is, LU0 to 7. As can be seen from the table 901, the host computer having WWN902 is permitted to gain access within the range of LU0 to 5, the host computer having WWN903, within the range of LU6 to 10 and the host computer having WWN904, within the range of LU11 to 15. FIG. 10 visually shows this condition.

Host computers 1002 to 1004 correspond to the host computers having WWN902 to 904 in FIG. 9. The host computers 1002 to 1004 are connected to the same port 1006 of the storage subsystem 1001 through a hub, switch or router 1005 corresponding to the Fiber Channel. When LU inside the storage subsystem are allocated such as the LU group 1008 to the host computers 1002 to 1004, only the range of LU0 to 5 in the LU group 1008 appears as the access permitted object to the host computer A1002, and only the range of LU11 to 15 in the LU group 1008 appears as the access permitted object to the host computer C1004. In either case, the object of LUN security can be achieved. However, because the host computer B1003 can originally recognize up to 8 LU within the range of LU0 to 7 under one port, it can make inquiry only within the range of the LU group 1007. Therefore, even when the access to LU6 to 10 is permitted in the table 901, the host computer B1003 can practically gain access to only LU6 and 7. This is the problem that occurs because LU arbitrarily numbered under the same port inside the storage subsystem is as such given.

In view of the problems described above, the present invention defines the "LUN access management table" 1101 shown in FIG. 11. The table 1101 is different from the table 701 shown in FIG. 7 and the table 901 shown in FIG. 9 that merely and directly allocate LUN arbitrarily numbered under the same port inside the storage subsystem to WWN.

The table 1101 associates WWN 1103 of the host computers having the possibility of access with GID (Group ID) 1102 allocated to these host computer groups when the user arbitrarily groups them, and imparts the logical unit number (LUN) 1104 that the user can set arbitrarily to these host computer groups in the storage areas capable of permitting the access inside the storage subsystem.

This table is generated in the port unit of the storage subsystem. In the storage subsystem defining this "LUN access management table" 1101, LUN can be flexibly numbered in accordance with the desire of use by the user for the host computer groups the user has arbitrarily grouped, and can be given.

When OS is different, the logical format for LU is generally different, too. Therefore, LU cannot be shared among different OS. For this reason, in the "LUN access management table" 1101, the groups the user registers are generally the host computer groups having the same OS mounted thereto.

When the desired use condition by the user (such as exchange bus construction, cluster construction among host computers, etc) are incorporated in further detail in this host computer group registration, so-called "user friendliness" can be further improved and at the same time, the storage area inside the storage subsystem can be utilized more efficiently. A detailed set example of the "LUN access management table" 1101 will be explained with reference to FIG. 11.

In the table 1101, the host computer group having WWN1112 to WWN1114 has the same OS kind 1 mounted thereto and is categorized as Group A 1105. The access to LU0 to 3 inside the storage subsystem is permitted to this host computer group. Storage area numbers 0 to 3 (hereinafter called "#0 to 3") are allocated to these LU0 to 3 inside the storage subsystem.

A host computer group having WWN1115 to WWN1117 has the same OS kind 2 and is categorized as Group B 1106. Though it seems that the access to LU0 to 3 is also permitted to the host computer group, the storage areas #60 to 63 are allocated to these LU0 to 3 inside the storage subsystem and exclusion is attained from the use storage areas of Group A 1105 described above. In this way, LUN security in the invention is achieved.

On the other hand, a host computer group having WWN1118 to WWN1121 is categorized as Group C 1107 but is a mixture of a host computer group having an OS kind 3 mounted thereto and a host computer group having an OS kind 4 mounted thereto. Generally, LU cannot be shared among computer groups because the logical formats are different if their OS kinds are different. When different OS kinds that can be shared exist, however, such grouping is possible. It seems that access to LU0 to 5 is continuously permitted in Group C 107. In practice, discrete storage areas #7, 11, 70, 79, 87 and 119 are allocated.

A host computer group having WWN1122 and 1123 is categorized as Group D 1108, but the host computer group has different OS kinds mounted thereto, that is, an OS kind 5 and an OS kind 6. The host computer group D 1108 has an advanced architecture capable of discretely recognizing other LU even when LU0 dos not exist under the port to be accessed. Therefore, accessible LU is defined by a complicated representation method of LU50, LU51 and LU62. Storage areas #40, 99 and 100 are allocated to these accessible LU.

Group registration to the "LUN access management table" 1101 need not necessarily have a plurality of host computers. When it is desired to stipulate LU the access to which is singly permitted for the host computer WWN1124, for example, Group E 1109 including one host computer needs be registered. Resolution of the host computer for which access is permitted can be improved. The access to LU0 to 1 is permitted to Group E 1109, and the storage areas # 4 and 5 are allocated.

A solution of the problem of limitation that has become a problem in the recent SAN environment will be shown. The host computer of WWN1125 and the host computer 1126 are categorized as Group F 1110 having an OS kind 7 that can recognize only 256 LU under the single port. It will be assumed that a user's request for recognizing 512 LU under the single port exists in practice. In this case, the host computer of WWN1125 and the host computer 1126 are again registered as a separate Group G 1111. Since both host computers can recognize maximum 256 LU, LU0 to 255 for Group F 1110 and LU0 to 255 for Group G 1111 are defined as access permitted LU. The storage areas #0 to 255 are allocated to LU0 to 255 of Group F 1110 and the storage areas #256 to 512 are allocated to LU0 to 255 of Group G 1111. In this way, 512 LU are given without changing the existing processing, limitation and other functions of the host computers, and the LUN security function of the invention is accomplished.

Finally, a set pattern different from those described above will be explained. The host computers of WWN1129 and WWN1130 and the host computers of WWN1131 and WWN1132 are those host computers that have the same OS kind 8 but exist on different floors. It will be assumed that a manager handling these host computers desires to give files and applications by different access LUN to these four host computers but the entity given has the same content in the same storage area. In such a case, setting of Group H 1127 and Group I 1128 of the table 1101 may be employed. In this case, LU0 and 1 is given to Group H 1127 and LU 4 and 5, to Group I 1128, but the practical reference destination storage area # is the same 10 and 11. The access from other host computers is rejected. In this way, the LUN security function according to the invention can be provided to satisfy the object of the manager.

Grouping of the host computers by using the "LUN access management table" of the invention and association of LUN have thus been given concretely. This can be visually shown in FIG. 13. The corresponding "LUN access management table" 1201 is shown in FIG. 12. The LUN access management table 1201 associates WWN 1203 of the host computers having the possibility of access with GID (Group ID) 1202 allocated to these host computer groups when the user arbitrarily grouns them, and imparts the logical unit number (LUN) 1204 that the user can set arbitrarily to these host computer groups in the storage areas capable of permitting the access inside the storage subsystem.

Figure 13:
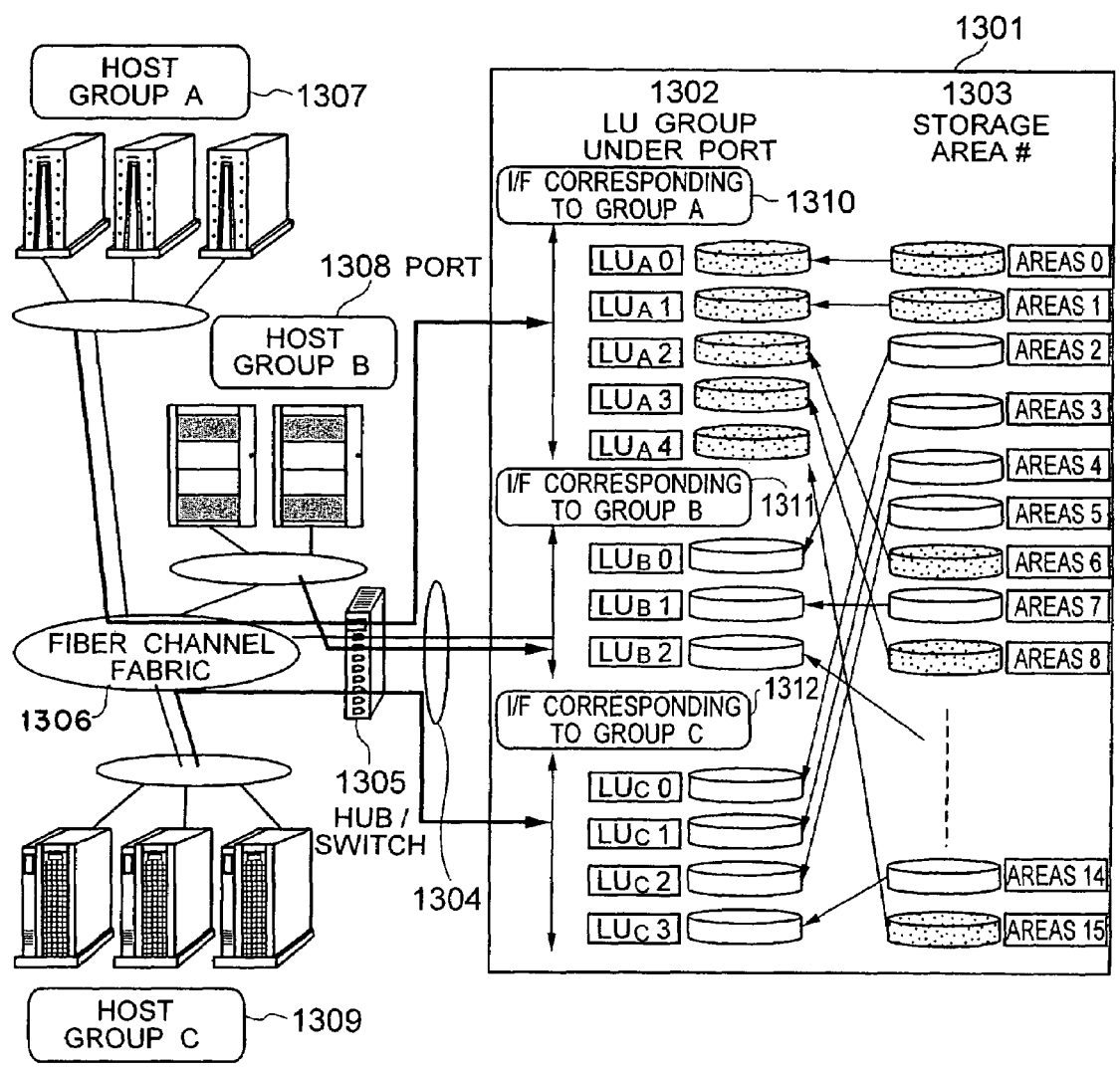
FIG. 13 visually shows the effect of LUN security in the embodiment of the invention.
Figure 14:
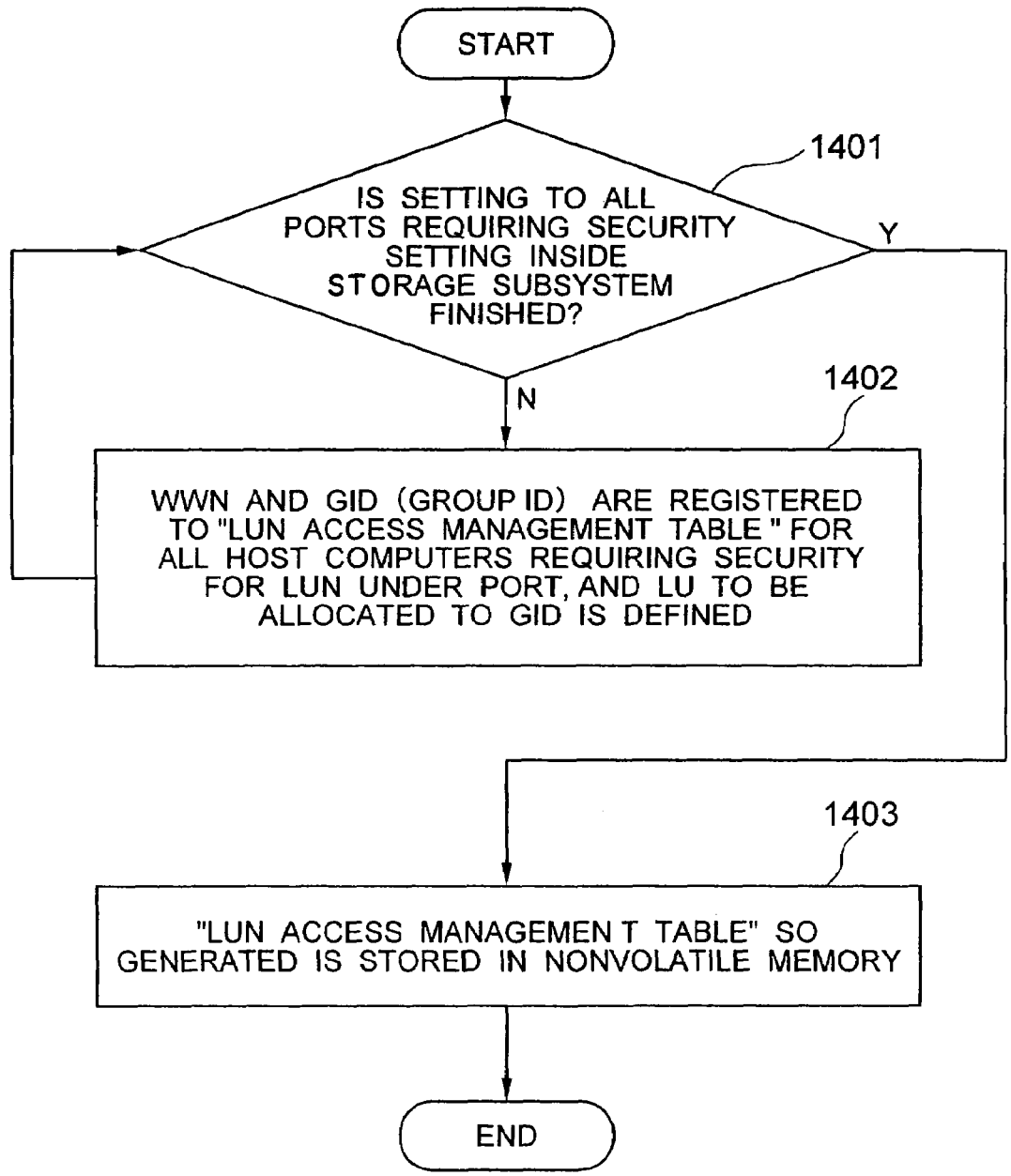
FIG. 14 is a flowchart showing a generation sequence of the "LUN access management table" according to the embodiment of the invention.

As per FIG. 13 the apparatus illustrated therein includes a storage subsystem 1301 which includes port 1304 for Fiber Channel interface, and is physically connected to host computers of host groups 1307 to 1309 through Fiber Channel fabric 1306 and hub switch 1305.

Referring to the table 1201, the LU group 1204 permitting the access to each host computer group 1205 to 1207 have practically an entirely random arrangement as represented by the storage area group 1303 shown in FIG. 13. However, when the LU group 1204 is mapped to the LU group 1204 of the table 1201, it takes the condition of the LU group 1302 shown in FIG. 13, and LU can be given without causing the host computer groups 1307 to 1309 to be aware of the practical arrangement condition 1303 of the storage area groups inside the storage subsystem. Incidentally, the host computer groups 1307 to 1309 in FIG. 13 correspond to the host computer groups 1205 to 1207 in FIG. 12.

In this way, LUN security in the invention can be accomplished without changing the existing processing, limitation and other functions of the host computers, and flexible and efficient utilization of the storage subsystem resources becomes possible.

Because grouping of the host computers is accomplished as described above, connection interface information 1310 to 1312 (FIG. 13) can be set for each host computer group under the single port inside the storage subsystem 1301.

Connection interface information represents, for example, reception I/O of the storage subsystem, the depth of a reception queue and the response content of Inquiry. In the storage subsystems according to the prior art, interface information under the single port is generally single.

As represented by Steps 1401 to 1403, the "LUN access management table" 1101 or 1201 according to the invention is defined for all the ports of the storage subsystem and is then stored in the nonvolatile memory inside the storage subsystem. Since the table is thus stored in the nonvolatile memory, it does not extinguish even when the power source of the storage subsystem is cut off. The table may also be stored in a predetermined storage device 115 (storage device 101 in FIG. 1).

Next, the login processing from the host computer to the storage subsystem will be explained. In this embodiment, GID (Group ID) is acquired from WWN primarily identifying the host computer through a series of login processing and is allowed to correspond to S-ID that primarily identifies the host computers that are used after this login.

Figure 15:
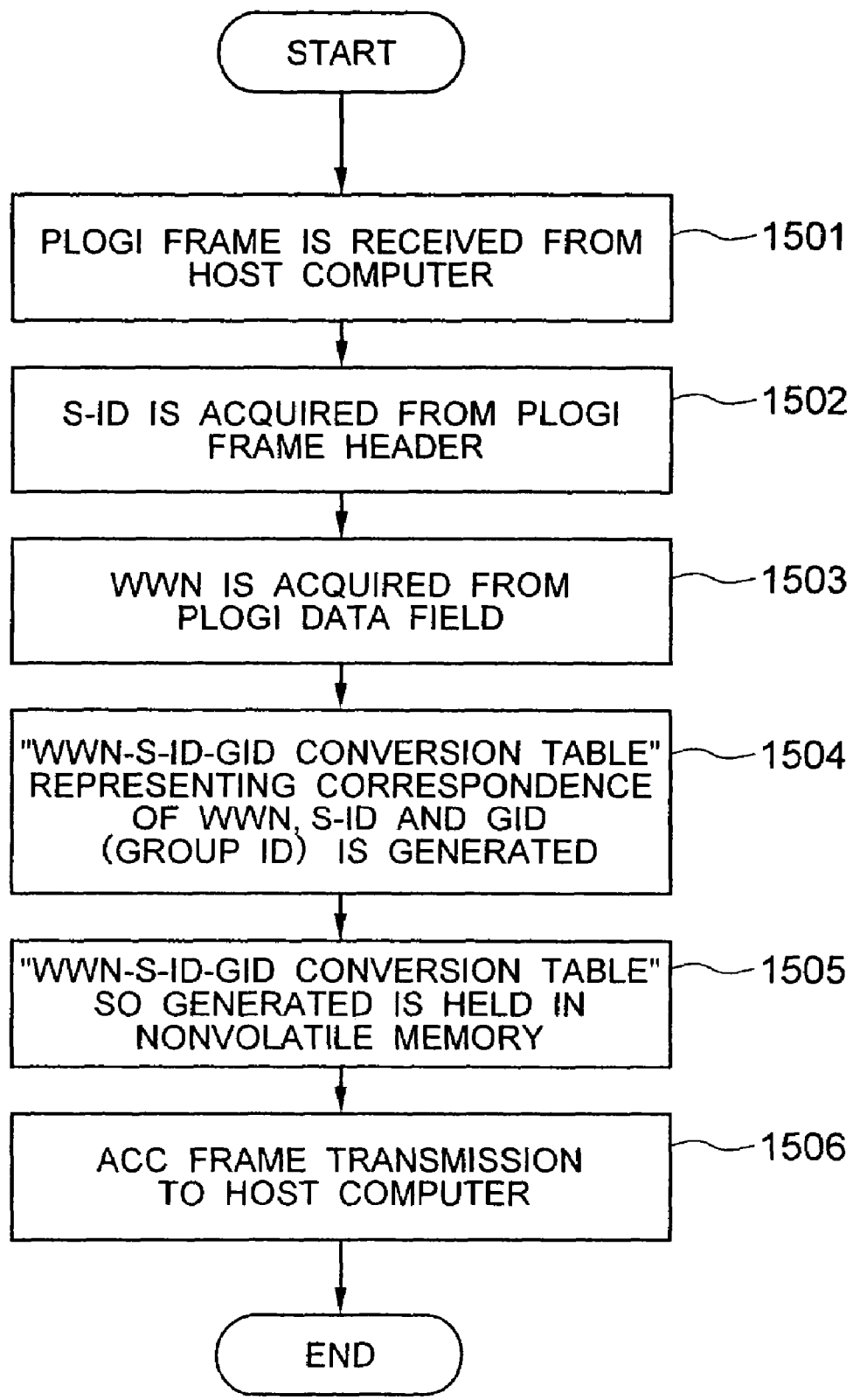
FIG. 15 is a flowchart showing a generation sequence of a "WWN-S-ID-GID conversion table" according to the embodiment of the invention.

When the host computer is activated, the storage subsystem receives the PLOGI frame in Step 1501 in FIG. 15. Receiving the PLOGI frame, the storage subsystem acquires S-ID of the host computer from the frame header in Step 1502 and WWN (N-Port-Name) of the host computer from the data field in Step 1503. Subsequently, the storage subsystem generates and records this WWN, S-ID and GID (Group ID) to "WWN-S-ID-GID conversion table" 1601 shown in FIG. 16 in Step 1504, and holds them in the nonvolatile memory inside the storage subsystem in Step 1505. Here, GID is acquired when the "LUN access management table" generated by the user is retrieved by using WWN as the key as described above. The "WWN-S-ID-GID conversion table" 1601 is generated for each of the storage subsystems.

When the host computer having WWN registered to this table subsequently transmits the command, the storage subsystem acquires S-ID from its frame header, and can know GID corresponding to S-ID by using the "WWN-S-ID-GID conversion table" 1601. Storing this "WWN-S-ID-GID conversion table" 1601 in the nonvolatile memory, the storage subsystem transmits an ACC frame representing that login of the host computer is approved, in Step 1506. Receiving the ACC frame from the storage subsystem, the host computer can thereafter generate the Inquiry command to the storage subsystem.

Figure 17:
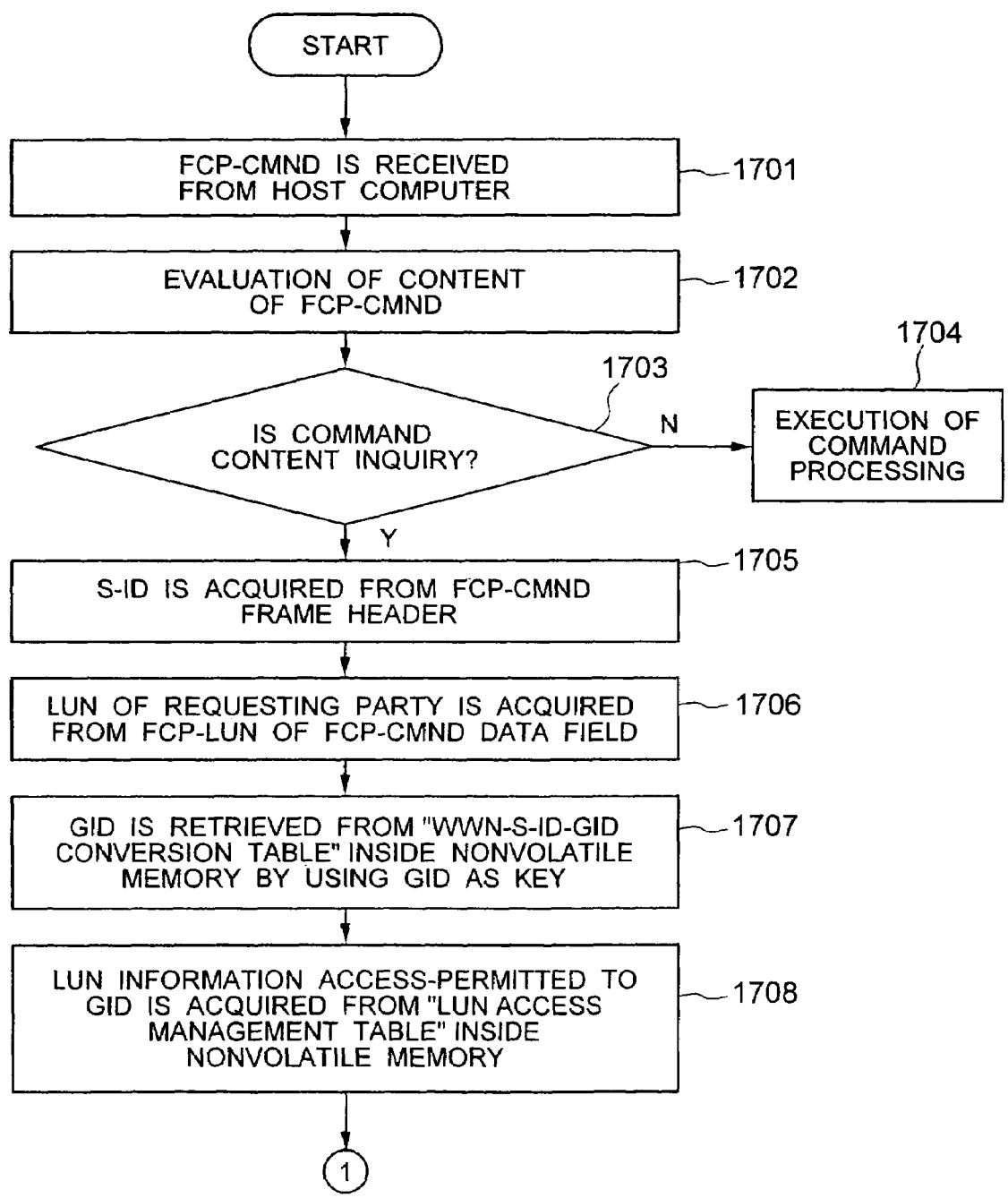
FIG. 17 is a flowchart showing a LUN access approval/rejection judgment sequence for an Inquiry command of host computer transmission of LUN security according to the embodiment of the invention.
Figure 18:
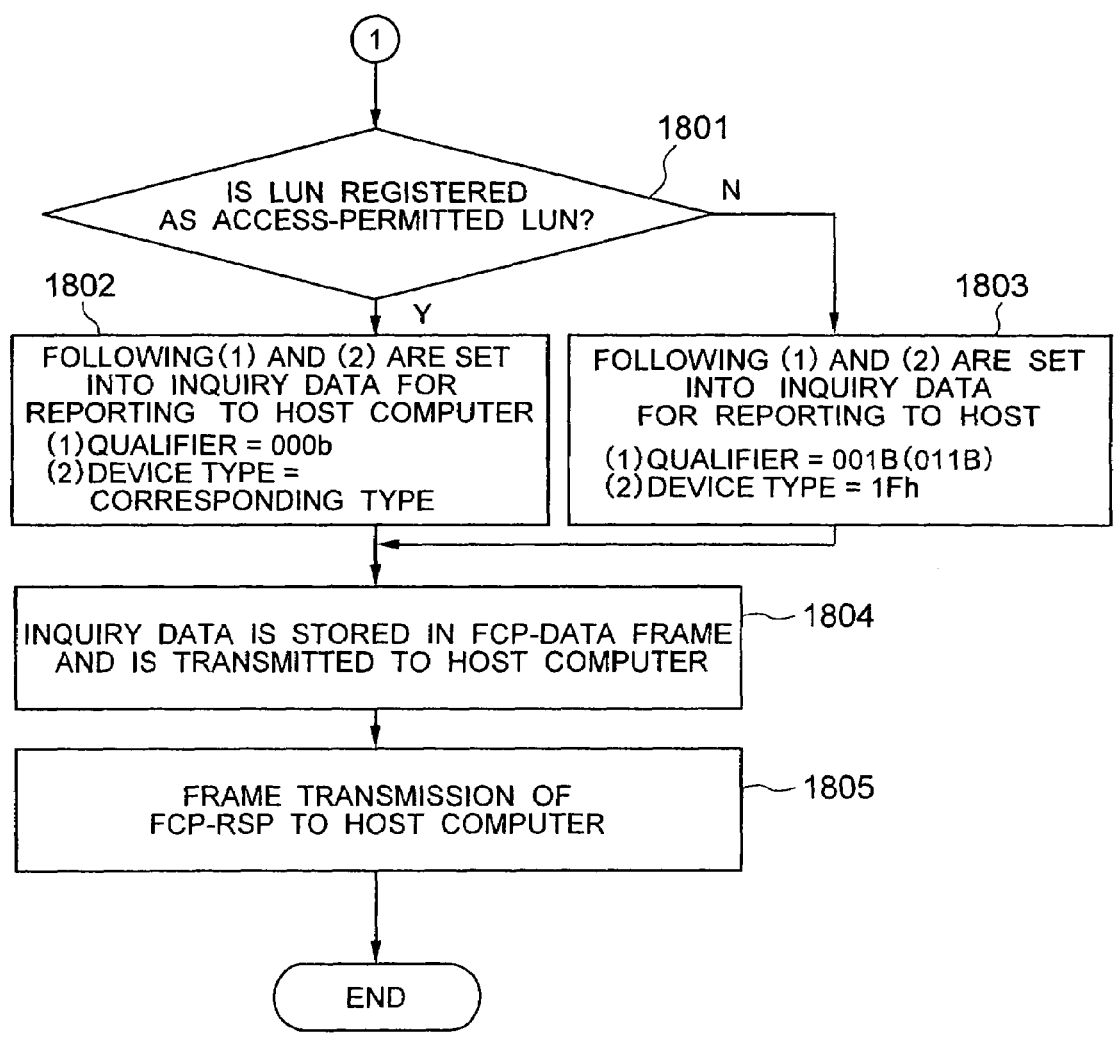
FIG. 18 is a flowchart showing continuation of the flowchart shown in FIG. 17.
Figure 19:
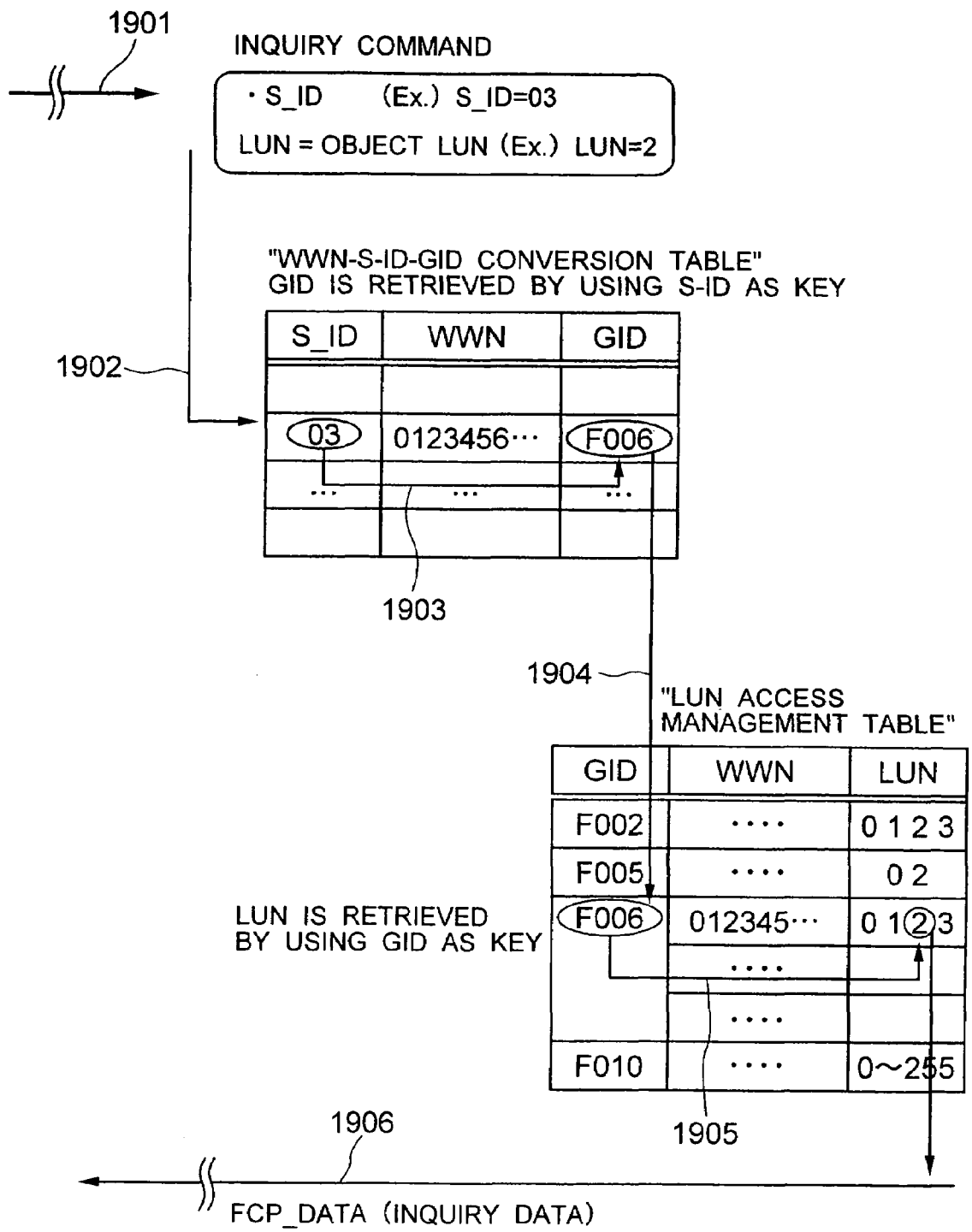
FIG. 19 shows a reference relation among tables of LUN security according to the embodiment of the invention.

Next, Inquiry command reception from the host computer and the security response of the storage subsystem to the former will be explained. FIGS. 17 and 18 show the flow of a series of processing, and FIG. 19 shows the reference relation of each table and parameters used in the flow of processing.

In Step 1701 in FIG. 17, the storage subsystem receives an FCP-CMND frame stipulated to the Fiber Channel from the host computer. Then, the storage subsystem analyzes the content of the data frame of this FCP-CMND in Step 1702.

Subsequently, the storage subsystem checks whether or not the content of this FCP-CMND is the Inquiry command in Step 1703. When it is not the Inquiry command, the storage subsystem executes a processing corresponding to the command in Step 1704. When it is the Inquiry command, on the other hand, the storage subsystem acquires S-ID of the host computer from the header of this FCP-CMND frame in Step 1705 and then acquires object LUN from FCP-LUN of the data field of this FCP-CMND in Step 1706.

In subsequent Step 1707, the storage subsystem retrieves the "WWN-S-ID-GID conversion table" 1601 shown in FIG. 16 by using resulting S-ID as the key and acquires GID corresponding to this S-ID. The flow up to this step represents the reference operation of Steps 1901, 1902 and 1903 in FIG. 19.

When GID for this S-ID is not retrieved from the table 1601 in Step 1903, the user does not register LUN, the access of which is permitted to the host computer, and the access to LUN requested from the host computer is rejected.

In subsequent Step 1708 (FIG. 17), the information of the access-permitted LUN is acquired for this GID. In Step 1801 (FIG. 18), whether or not LUN acquired from the Inquiry command of the host computer having this GID is registered as the access-permitted LUN on the "LUN access management table" is judged. The flow up to this step represents the reference operation of Steps 1904 and 1905 in FIG. 19.

The reference operation in Steps 1904 to 1905 retrieves LUN the access to which is permitted from S-ID, by using GID as the key. Since this GID is the attribute of the group of individual WWN, the ratio of GID to access-permitted LUN generally equals to the ratio of multiple to 1. In comparison with the relation in the prior art, that is, the ratio of WWN of LUN security using WWN as key to access-permitted LUN equals to unity, the resolution capacity on the side of the host computer drops but the retrieval operation becomes easier and has generally a higher speed.

When LUN acquired in Step 1706 is registered to the entry of the "LUN access management table" (FIGS. 11 and 12), the access from the host computer to this LUN is permitted. Therefore, in Step 1802 (FIG. 8), the storage subsystem sets "000" of the binary digit to the qualifier of the Inquiry data for the response to the host computer and the device type code of the storage subsystem to the device type.

On the other hand, when LUN acquired in Step 1706 is not registered as virtual LUN to the corresponding entry of the "LUN access management table", the access from the host computer to this virtual LUN is rejected. Therefore, in Step 1803, the storage subsystem sets "001" or "011" of the binary digit to the qualifier of the Inquiry data for the response to the host computer and "1F" of the hexadecimal digit to the device type.

Next, in Step 1804, the storage subsystem sets the inquiry data for response to the FOP-DATA frame and transmits it to the host computer as per Step 1906. In subsequent Step 1805, the storage subsystem transmits an FGP-RSP frame representing the finish of the response of the Inquiry command of the host computer.

In succession to Steps 1802 and 1804 in FIG. 18, the host computer that receives FCP-DATA inclusive of the Inquiry data from the storage subsystem judges that the access to the corresponding LUN is possible, and can continue the access without inquiring again thereafter access approval/rejection of this LUN. Here, LUN to which the host computer gains access is practically the storage area # inside the storage subsystem that is primarily associated with LUN.

On the other hand, the host computer that receives FCP-DATA inclusive of the Inquiry data from the storage subsystem in succession to Steps 1803 to 1804 judges that the access to this LUN is not possible, and does not inquire again access approval/rejection to this LUN and does not try to gain access, either.

In this embodiment, it is only at the time of generation of the Inquiry command that the host computer inquires access approval/rejection to LUN. In other words, while login remains effective, this inquiry need not be repeated. In consequence, strong LUN security can be accomplished without lowering data transfer efficiency between the host computer and the storage subsystem.

Incidentally, when a function f having a correlation "storage area #=f(GID, LUN)" is set in mapping from LUN to the storage area # inside the storage subsystem, an effective storage area # is outputted for effective GID and LUN values but is not outputted for other values.

Here, f(n, m) is a function for effecting mapping conversion of LUN given to the host computer to the storage area # inside the storage subsystem by using GID and LUN as the parameters. Consequently, in the Write command and the Read command subsequent to the Inquiry command, the check of access approval/rejection can be executed with minimum overhead during the conversion operation from designated LUN to the storage area # without calling for the retrieval operation of Steps 1901 to 1905.

As described above, when the method is employed that handles a plurality of host computer groups under the same port, and allows the user to arbitrarily select and set the allocation of LU in the group unit, LUN security can be accomplished with high-speed judgment logic and with high utilization efficiency of the memory area inside the storage subsystem without changing the existing processing, limitation and other functions on the side of the host computer.

This embodiment has been described about the Fiber Channel by way of example. To practice the invention, however, the invention is not particularly limited to the Fiber Channel, and the kind of the protocol environment is not restrictive so long as it can provide equivalent functions. As to the storage subsystem, too, this embodiment has been described mainly on the assumption of the disk array apparatus, but the apparatus can be ordinary magnetic disk apparatuses, and optical disk library and tape library capable of interfacing the storage system can replace this disk array is apparatus.

The invention can be executed among a plurality of storage subsystems in consideration of recent virtualization of the SAN environment. In this case, the invention has the construction in which definition and set items of each of the tables described above are executed on one storage subsystem, communication paths are disposed so that the definition/setting can be transmitted to the logical units inside other storage subsystems, and one storage subsystem executes centralized control.

Such centralized control and definition of necessary tables need not always be executed on a specific storage subsystem but may be provided to program processing on the host computer or to internal processing on a switching hub or a router so long as the storage subsystems are connected by a common interface such as the Fiber Channel and the logical units inside a plurality of storage subsystems can be recognized.

When LUN security according to the invention is accomplished among a plurality of storage subsystems connected by the network such as the Fiber Channel, the storage subsystems having the ports for connecting the storage subsystems including the access-permitted logical units and the host computer groups, the switch or the router need not be built in the same casing.

The invention uses the management table inside the storage subsystem and gives the logical unit inside the storage subsystem to the host computer groups that are arbitrarily grouped by the user in accordance with the desired form of operation of the user, limits access approval/rejection to LU inside the storage subsystem in the group unit and at the same time, can provide the security function capable of setting the interface of connection in the group unit under the single port of the storage subsystem without changing the existing processing, limitation and other functions of the computer.

Furthermore, since the access approval/rejection judgment to LU inside the storage subsystem can be known at the point of time of generation of the inquiry command such as the Inquiry command and this judgment need not be thereafter repeated. Therefore, the strong security function to LU can be secured while the storage subsystem is kept operated with high performance.

It should be further understood by those skilled in the art that the foregoing description has been made on embodiments of the invention and that various changes and modifications may be made in the invention without departing from the spirit of the invention and the scope of the appended claims.

What is claimed is:

1. A storage system adapted to be coupled to a plurality of host computers, said storage system comprising:
a plurality of disk drives storing data from said host computers, said disk drives being related to a plurality of storage areas, each of said storage areas to be identified with a storage area number; and
a controller controlling read/write of data from/to said disk drives in response to accesses from said host computers,
wherein said controller includes management information which includes, in corresponding relation, an identification of a host group including some of said host computers selected by a user from said host computers, an identification of each host computer of said some of said host computers included in said host group, and said storage area numbers, wherein said some of said host computers included in said host group have a host computer executing a first type of operating system (OS) and a host computer executing a second type of OS being different from said first type of OS,
wherein said controller controls to transfer a response frame, including information corresponding to an approval or a rejection of an access to one of said storage areas, to said each host computer of said some of said host computers in response to a command from said each host computer of said some of said host computers to said one of said storage areas in accordance with said management information,
wherein connection interface information is set for each host group on a host group basis under a single port inside said storage system, and
wherein connection interface information represents a depth of a reception queue and a response content of an inquiry.

2. The storage system according to claim 1, wherein said identification of each host computer of said some of said host computers included in said host group is a World Wide Name (WWN).

3. The storage system according to claim 1, wherein each of said storage area numbers of storage areas allocated to said host computers begins with 0.

4. The storage system according to claim 1, wherein each of said storage area numbers of storage areas allocated to said host computers begins with 0 and increments by 1.

5. The storage system according to claim 1, wherein said controller maps different storage area numbers to a same storage area number of each of said storage areas for different host computers.

6. The storage system according to claim 1, wherein a same identification of each of said storage areas is allocated to different host computers.

7. The storage system according to claim 1, wherein when a first storage area number of a storage area accessible from a first host computer is the same as a second storage area number of a storage area accessible from a second host computer, an identification of the first host computer and an identification of the second host computer is different from each other.

8. The storage system according to claim 1, wherein when a first host computer and a second host computer commonly use a same storage area, a storage area number of a storage area corresponding to the same storage area as recognized by said first host computer is different from a storage area number of a storage area corresponding to the same storage area as recognized by said second host computer.

9. The storage system according to claim 1, wherein there is a plurality of storage area numbers of storage areas with the same storage area number 0 under one physical port of said storage system.

10. The storage system according to claim 2, wherein there is a plurality of storage area numbers of storage areas with the same storage area number 0 under one physical port of said storage system.

11. A storage system according to claim 2, wherein said controller includes a WWN to S_ID conversion table, and
wherein said S_ID is a source identification of a host computer.

* * * * *

UNITED STATES PATENT AND TRADEMARK OFFICE
CERTIFICATE OF CORRECTION

| | | |
|---|---|---|
| PATENT NO. | : 7,657,727 B2 | Page 1 of 1 |
| APPLICATION NO. | : 11/407978 | |
| DATED | : February 2, 2010 | |
| INVENTOR(S) | : Ryusuke Ito et al. | |

It is certified that error appears in the above-identified patent and that said Letters Patent is hereby corrected as shown below:

In the specification:

Column 11, line 61 to column 12, line 5, should read:

Grouping of the host computers by using the "LUN access management table" of the invention and association of LUN have thus been given concretely. This can be visually shown in FIG. 13. The corresponding "LUN access management table" 1201 is shown in FIG. 12. The LUN access management table 1201 associates WWN 1203 of the host computers having the possibility of access with GID (Group ID) 1202 allocated to these host computer groups when the user arbitrarily ~~grouns~~groups them, and imparts the logical unit number (LUN) 1204 that the user can set arbitrarily to these host computer groups in the storage areas capable of permitting the access inside the storage subsystem.

Signed and Sealed this
Seventh Day of June, 2011

David J. Kappos
*Director of the United States Patent and Trademark Office*